US012120015B2

(12) United States Patent
Chen et al.

(10) Patent No.: US 12,120,015 B2
(45) Date of Patent: Oct. 15, 2024

(54) SYSTEM AND METHOD FOR IMPLEMENTING CONTROLLER BORDER GATEWAY PROTOCOL (cBGP)

(71) Applicant: Huawei Technologies Co., Ltd., Shenzhen (CN)

(72) Inventors: Huaimo Chen, Bolton, MA (US); Linda Dunbar, Plano, TX (US)

(73) Assignee: Huawei Technologies Co., Ltd., Shenzhen (CN)

( * ) Notice: Subject to any disclaimer, the term of this patent is extended or adjusted under 35 U.S.C. 154(b) by 483 days.

(21) Appl. No.: 17/244,775

(22) Filed: Apr. 29, 2021

(65) Prior Publication Data

US 2021/0250275 A1    Aug. 12, 2021

Related U.S. Application Data

(63) Continuation of application No. PCT/US2019/058876, filed on Oct. 30, 2019.

(60) Provisional application No. 62/754,859, filed on Nov. 2, 2018.

(51) Int. Cl.
*H04L 45/02* (2022.01)

(52) U.S. Cl.
CPC .............. *H04L 45/04* (2013.01); *H04L 45/02* (2013.01)

(58) Field of Classification Search
None
See application file for complete search history.

(56) References Cited

U.S. PATENT DOCUMENTS

| 9,007,941 | B1* | 4/2015 | Miclea | H04L 65/1013 |
| | | | | 370/252 |
| 9,680,694 | B1* | 6/2017 | Kotrabasappa | H04L 45/68 |
| 9,883,264 | B2* | 1/2018 | Liou | H04Q 11/0062 |
| 2011/0149980 | A1* | 6/2011 | Patel | H04L 12/4641 |
| | | | | 370/401 |
| 2011/0164508 | A1* | 7/2011 | Arai | H04L 45/00 |
| | | | | 370/245 |
| 2011/0310903 | A1* | 12/2011 | Tu | H04L 45/586 |
| | | | | 370/392 |

(Continued)

FOREIGN PATENT DOCUMENTS

CN    107005474 A    8/2017

OTHER PUBLICATIONS

"Modeling the routing of an autonomous system with C-BGP" by Quoitin B., Uhlig S.; Nov. 1, 2005; IEEE Network.*

(Continued)

*Primary Examiner* — Xavier S Wong
(74) *Attorney, Agent, or Firm* — Conley Rose, P.C.

(57) ABSTRACT

A method performed by a controller configured to implement Border Gateway Protocol (BGP) in a communications system, comprising establishing a controller BGP (cBGP) peer session with a network element (NE), receiving a message for communication through the cBGP session from the NE, determining whether the message is permitted to be communicated through the cBGP session based on whether the message carries routing information; transmitting the message to the NE through the cBGP session when the message is permitted to be communicated through the cBGP session, and receiving a response message of the first type from the NE through the cBGP session.

18 Claims, 17 Drawing Sheets

(56) References Cited

U.S. PATENT DOCUMENTS

| | | | |
|---|---|---|---|
| 2012/0263049 A1* | 10/2012 | Venkatachalapathy | ................... H04L 41/12 370/252 |
| 2015/0334000 A1* | 11/2015 | Zhang | ................ H04L 45/02 370/254 |
| 2016/0359728 A1* | 12/2016 | Ficara | ................ H04L 45/033 |
| 2018/0109450 A1* | 4/2018 | Filsfils | ................ H04L 45/04 |
| 2018/0131604 A1 | 5/2018 | Zhou et al. | |

OTHER PUBLICATIONS

Hakiri et al., "Data-Centric Publish/Subscribe Routing Middleware for Realizing Proactive Overlay Software-Defined Networking," Distributed and Event-Based Systems, ACM, 2 Penn Plaza, Suite 701 New York NY 10121-0701, USA, Jun. 13, 2016 (Jun. 13, 2016), pp. 246-257, XP058260933, DOI: 10.1145/2933267.29333314, ISBN: 978-1-4503-4021-2.

Psenak, Ed., et al., "OSPF Extensions for Segment Routing," draft-ietf-ospf-segment-routing-extensions-27, Dec. 3, 2018, 29 pages.

Rekhter, Ed., et al., A Border Gateway Protocol 4 (BGP-4), RFC 4271, Jan. 2006, 104 pages.

Smith, "BGP for Internet Service Providers," Jan. 2, 2003 (Jan. 2, 2003), XP055657374, Retrieved from the Internet: URL: https//www.sanog.org/sanogl/bgintroduction.pdf, [retrieved on Jan. 13, 2020], 177 pages.

* cited by examiner

915A

```
 0                   1                   2                   3
 0 1 2 3 4 5 6 7 8 9 0 1 2 3 4 5 6 7 8 9 0 1 2 3 4 5 6 7 8 9 0 1
```

| Node Type (TBD) 1003 | Length (4 or 16 bytes) 1006 |
|---|---|
| Node IP Address (4 or 16 bytes, depending on IPv4 or IPv6 address) 1009 ||

| Link Type (TBD) 1011 | Length (8 or 32 bytes) 1012 |
|---|---|
| Link Local IP Address (4 or 16 bytes, depending on IPv4 or IPv6 address) 1013 ||
| Link Remote IP Address (4 or 16 bytes, depending on IPv4 or IPv6 address) 1014 ||

| IPv4 Prefix Type (TBD) 1021 | Length (variable) 1022 |
|---|---|
| Prefix Length 1023 | IPv4 Prefix 1024 |

| IPv6 Prefix Type (TBD) 1031 | Length (variable) 1032 |
|---|---|
| Prefix Length 1033 | IPv6 Prefix 1034 |

| Adjacency SID Type (TBD) 1041 | Length 1042 |
| Flags 1043 | Weight 1044 | Reserved |
| SID/Label/Index (variable) 1045 |

| 0 | 1 | 2 | 3 |
|---|---|---|---|
| 0 1 2 3 4 5 6 7 8 9 | 0 1 2 3 4 5 6 7 8 9 | 0 1 2 3 4 5 6 7 8 9 | 0 1 2 3 4 5 6 7 8 9 0 1 |

| Assign Adjacency SID Link Type (TBD) 1103 | Length (variable) 1106 |
|---|---|
| Adjacency SID sub-TLV 1040 ||
| Link sub-TLV 1010 ||

| 0 | 1 | 2 | 3 |
|---|---|---|---|
| 0 1 2 3 4 5 6 7 8 9 | 0 1 2 3 4 5 6 7 8 9 | 0 1 2 3 4 5 6 7 8 9 | 0 1 2 3 4 5 6 7 8 9 0 1 |

| Flow Redirect Type (TBD) 1153 | Length (variable) 1156 |
|---|---|
| Indirection_ID 1159 ||
| Flow Specification 1161 ||

| 0 | | | | | | | | | | 1 | | | | | | | | | | 2 | | | | | | | | | | 3 | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| Status Type (TBD) 1203 ||||||||||||||||| Length (variable) 1206 |||||||||||||||
| Reserved (Zero) ||||||||||||| SB 1212 ||| Error Code 1215 ||||||||||||||||
| Reasons if fails (optional) 1217 ||||||||||||||||||||||||||||||||

FIG. 12

SYSTEM AND METHOD FOR IMPLEMENTING CONTROLLER BORDER GATEWAY PROTOCOL (cBGP)

CROSS-REFERENCE TO RELATED APPLICATIONS

This application is a continuation of International Application No. PCT/US2019/058876 filed on Oct. 30, 2019, by Futurewei Technologies, Inc., and titled "System and Method for Implementing Controller Border Gateway Protocol (cBGP)," which claims the benefit of U.S. Provisional Patent Application No. 62/754,859 filed Nov. 2, 2018, by Huaimo Chen and titled "New BGP Peer Session for Controller," which is hereby incorporated by reference.

TECHNICAL FIELD

The present disclosure is generally related to network communications, and in particular, to various systems and methods for reducing the overhead in networks implementing Border Gateway Protocol (BGP).

BACKGROUND

BGP (Border Gateway Protocol) is protocol that manages the transmission of packets across the Internet through the exchange of routing and reachability information between edge network elements (NEs), such as routers, positioned within a communications system. BGP directs packets between autonomous systems (AS), or networks managed by a single enterprise or service provider. BGP offers network stability guaranteeing that network elements (NEs) can quickly adapt to send packets through another reconnection if a particular path fails. An NE implementing BGP (e.g., a BGP NE) performs routing decisions based on paths, rules, or network policies configured by a network administrator.

The BGP NE maintains a routing table containing routing information from both directly connected NEs connected to an external AS as well as NEs within the same AS, and continually updates the routing table as changes occur. The BGP NE sends updated routing information through all the NEs in the communications system every time a change occurs to the routing information.

SUMMARY

A first aspect of the present disclosure relates to a method performed by a controller configured to implement Border Gateway Protocol (BGP) in a communications system, comprising establishing a controller BGP (cBGP) peer session with a network element (NE), receiving a message for communication through the cBGP session from the NE, determining whether the message is permitted to be communicated through the cBGP session based on whether the message carries routing information, transmitting the message of the first type to the NE through the cBGP peer session if the message is permitted to be communicated through the cBGP peer session, and receiving a response message of the first type from the NE through the cBGP peer session.

Optionally, in a first implementation according to the first aspect, the method further comprises receiving a second message for communication through the cBGP session from the NE, determining whether the second message is permitted to be communicated through the cBGP session based on whether the second message carries the routing information, and discarding the second message in response to the second message including the routing information.

Optionally, in a second implementation according to the first aspect or any other implementation of the first aspect, the routing information comprises information describing elements along a path from a source to a destination in the communications system.

Optionally, in a third implementation according to the first aspect or any other implementation of the first aspect, the method further comprises receiving a BGP UPDATE message carrying the routing information from another NE, and discarding the BGP UPDATE message.

Optionally, in a fourth implementation according to the first aspect or any other implementation of the first aspect, the method further comprises receiving a BGP UPDATE message carrying the routing information and instructions, removing the routing information from the BGP UPDATE message, and transmitting only the instructions of the BGP UPDATE message to the NE though the cBGP session.

Optionally, in a fifth implementation according to the first aspect or any other implementation of the first aspect, a first type of message is permitted to be communicated through the cBGP session and a second type of message is prohibited from being communicated through the cBGP session, wherein the first type of message is a message carrying instructions, wherein the second type of message is a message carrying the routing information, wherein the controller and the NE are included in a common autonomous system (AS), wherein the method further comprises establishing an interior BGP (iBGP) session with the NE, wherein the iBGP session is separate and distinct from the cBGP session, and determining whether a second message received from the NE includes the routing information based on a format of the second message.

Optionally, in a sixth implementation according to the first aspect or any other implementation of the first aspect, a first type of message is a message carrying instructions, wherein a second type of message is a message carrying routing information, wherein the controller and the NE are included in a common autonomous system (AS), wherein the method further comprises establishing an interior BGP (iBGP) session with the NE, wherein the iBGP session is combined with the cBGP session, wherein the first type of message and the second type of message are permitted to be communicated through the combined session.

Optionally, in an seventh implementation according to the first aspect or any other implementation of the first aspect, a first type of message is permitted to be communicated through the cBGP session and a second type of message is prohibited from being communicated through the cBGP session, wherein the first type of message is a message carrying instructions, wherein the second type of message is a message carrying the routing information, wherein the controller is included in a first autonomous system (AS), wherein the NE is included in a second AS different from the first AS, wherein the method further comprises establishing an exterior BGP (eBGP) session with the NE, wherein the eBGP session is separate and distinct from the cBGP session, and determining whether a second message received from the NE includes the routing information based on a format of the second message.

Optionally, in an eighth implementation according to the first aspect or any other implementation of the first aspect, a first type of message is a message carrying instructions, wherein a second type of message is a message carrying the routing information, wherein the controller is included in a first autonomous system (AS), wherein the NE is included in a second AS different from the first AS, wherein the method further comprises establishing an exterior BGP (eBGP) session with the NE, wherein the eBGP session is combined with the cBGP session, and wherein the first type of message and the second type of message are permitted to be communicated through the combined session.

Optionally, in a ninth implementation according to the first aspect or any other implementation of the first aspect, the method further comprising obtaining a peer group, wherein the peer group comprises a plurality of NEs, wherein the plurality of NEs include the NE, wherein a cBGP session is established between the controller and each of the plurality of NEs, receiving a third message comprising information of a first type from the NE, and distributing the third message to other NEs in the peer group in response to the information of the first type being permitted to be distributed to the other NEs in the peer group based on a peer group policy.

Optionally, in a tenth implementation according to the first aspect or any other implementation of the first aspect, the plurality of NEs in the peer group are grouped together based on at least one of a tenant identifier (ID), a geographical district, a zone, a group name, or encryption method.

Optionally, in a eleventh implementation according to the first aspect or any other implementation of the first aspect, establishing the cBGP session with the NE comprises sending a first OPEN message to the NE, wherein the first OPEN message comprises capabilities supported by the controller, and receiving a second OPEN message from the NE, wherein the second OPEN message comprises capabilities supported by the NE.

Optionally, in a twelfth implementation according to the first aspect or any other implementation of the first aspect, the first OPEN message comprises an I flag and a C flag, wherein the I flag is set to indicate whether an independent cBGP session is to be established or a combined cBGP session is to be established, wherein the C flag is set to indicate that the first OPEN message is sent by the controller.

Optionally, in a thirteenth implementation according to the first aspect or any other implementation of the first aspect, the controller is a Route Reflector (RR) within an autonomous system (AS).

A second aspect of the present disclosure relates to a method performed by a network element (NE) configured to implement Border Gateway Protocol (BGP) in a communications system, comprising establishing a controller BGP (cBGP) peer session with a controller of the communications system, receiving a message from the controller through the cBGP peer session, determining whether the message is permitted to be communicated through the cBGP session based on whether the message carries routing information, and transmitting a response message to the controller through the cBGP peer session.

Optionally, in a first implementation according to the second aspect, the method further comprises receiving a second message for communication through the cBGP session to the controller, determining whether the second message is permitted to be communicated through the cBGP session based on whether the second message carries the routing information, and discarding the second message in response to the second message including the routing information.

Optionally, in a second implementation according to the second aspect or any other implementation of the first aspect, the routing information comprises information describing elements along a path from a source to a destination in the communications system.

Optionally, in a third implementation according to the second aspect or any other implementation of the first aspect, the method further comprising receiving a BGP UPDATE message carrying the routing information from another NE, and discarding the BGP UPDATE message.

Optionally, in a fourth implementation according to the second aspect or any other implementation of the first aspect, the method further comprising receiving a BGP UPDATE message carrying the routing information and instructions, removing the routing information from the BGP UPDATE message, and transmitting only the instructions of the BGP UPDATE message to the controller through the cBGP session.

Optionally, in a fifth implementation according to the second aspect or any other implementation of the first aspect, a first type of message is permitted to be communicated through the cBGP session and a second type of message is prohibited from being communicated through the cBGP session, wherein the first type of message is a message carrying instructions, wherein the second type of message is a message the carrying routing information, wherein the controller and the NE are included in a common autonomous system (AS), wherein the method further comprises establishing an interior BGP (iBGP) session with the controller, wherein the iBGP session is separate and distinct from the cBGP session, and determining whether a second message received from the controller includes the routing information based on a format of the second message.

Optionally, in a sixth implementation according to the second aspect or any other implementation of the first aspect, a first type of message is a message carrying instructions, wherein a second type of message is a message carrying the routing information, wherein the controller and the NE are included in a common autonomous system (AS), wherein the method further comprises establishing an interior BGP (iBGP) session with the controller, wherein the iBGP session is combined with the cBGP session, and wherein the first type of message and the second type of message are permitted to be communicated through the combined session.

Optionally, in an seventh implementation according to the second aspect or any other implementation of the first aspect, a first type of message is permitted to be communicated through the cBGP session and a second type of message is prohibited from being communicated through the cBGP session, the first type of message is a message carrying instructions, wherein the second type of message is a message carrying the routing information, wherein the controller is included in a first autonomous system (AS), wherein the NE is included in a second AS different from the first AS, wherein the method further comprises establishing an exterior BGP (eBGP) session with the controller, wherein the eBGP session is separate and distinct from the cBGP session, and determining whether a second message received from the NE includes the routing information based on a format of the second message.

Optionally, in an eighth implementation according to the second aspect or any other implementation of the first aspect, a first type of message is a message carrying instructions, wherein a second type of message is a message carrying the routing information, wherein the controller is included in a first autonomous system (AS), wherein the NE is included in a second AS different from the first AS, wherein the method further comprises establishing an exterior BGP (eBGP) session with the NE, wherein the eBGP session is combined with the cBGP session, and wherein the first type of message and the second type of message are permitted to be communicated through the combined session.

Optionally, in a ninth implementation according to the second aspect or any other implementation of the first aspect, the plurality of NEs in the peer group are grouped together based on at least one of a tenant identifier (ID), a geographical district, a zone, a group name, or encryption method.

Optionally, in a tenth implementation according to the second aspect or any other implementation of the first aspect, establishing the cBGP peer session with the NE comprises sending a first OPEN message to the controller, wherein the first OPEN message comprises capabilities supported by the NE, and receiving a second OPEN message from the controller, wherein the second OPEN message comprises capabilities supported by the controller.

Optionally, in a eleventh implementation according to the second aspect or any other implementation of the first aspect, the first OPEN message comprises an I flag and a C flag, wherein the I flag is set to indicate whether an independent cBGP session is to be established or a combined cBGP session is to be established, wherein the C flag is set to indicate that the first OPEN message is not sent by the controller.

A third aspect of the present disclosure relates to an apparatus comprising a memory configured to store instructions, and a processor coupled to the memory and configured to execute the instructions, which when executed by the processor, causes the processor to be configured to establish a controller BGP (cBGP) peer session with a network element (NE), receive a message for communication through the cBGP session from the NE, determine whether the message is permitted to be communicated through the cBGP session based on whether the message carries routing information, transmit the message to the NE through the cBGP session if the message is permitted to be communicated through the cBGP session, and receive a response message of the first type from the NE through the cBGP session.

Optionally, in a first implementation of the third aspect, the instructions further causing the processor to be configured to receive a second message for communication through the cBGP session from the NE, determine whether the second message is permitted to be communicated through the cBGP session based on whether the second message carries the routing information, and discard the second message in response to the second message including the routing information.

A fourth aspect of the present disclosure relates to an apparatus comprising a memory configured to store instructions, and a processor coupled to the memory and configured to execute the instructions, which when executed by the processor, causes the processor to be configured to establish a controller BGP (cBGP) peer session with a controller of the communications system, receive a message from the controller through the cBGP session, determine whether the message is permitted to be communicated through the cBGP session based on whether the message carries routing information, and transmit a response message to the controller through the cBGP session.

Optionally, in a first implementation of the fourth aspect, the instructions further causing the processor to be configured to receive a second message for communication through the cBGP session to the controller, determine whether the second message is permitted to be communicated through the cBGP session based on whether the second message carries the routing information, and discard the second message in response to the second message including the routing information.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 10A-E are diagrams illustrating sub-Type Length Values (sub-TLVs) included in the control information according to various embodiments of the disclosure.

FIGS. 11A-B are diagrams illustrating sub-TLVs including instructions carried in the control information according to various embodiments of the disclosure.

FIG. 12 is a diagram illustrating a sub-TLV including a response or status carried in the control information attribute according to various embodiments of the disclosure.

DETAILED DESCRIPTION

It should be understood at the outset that although an illustrative implementation of one or more embodiments are provided below, the disclosed systems and/or methods may be implemented using any number of techniques. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
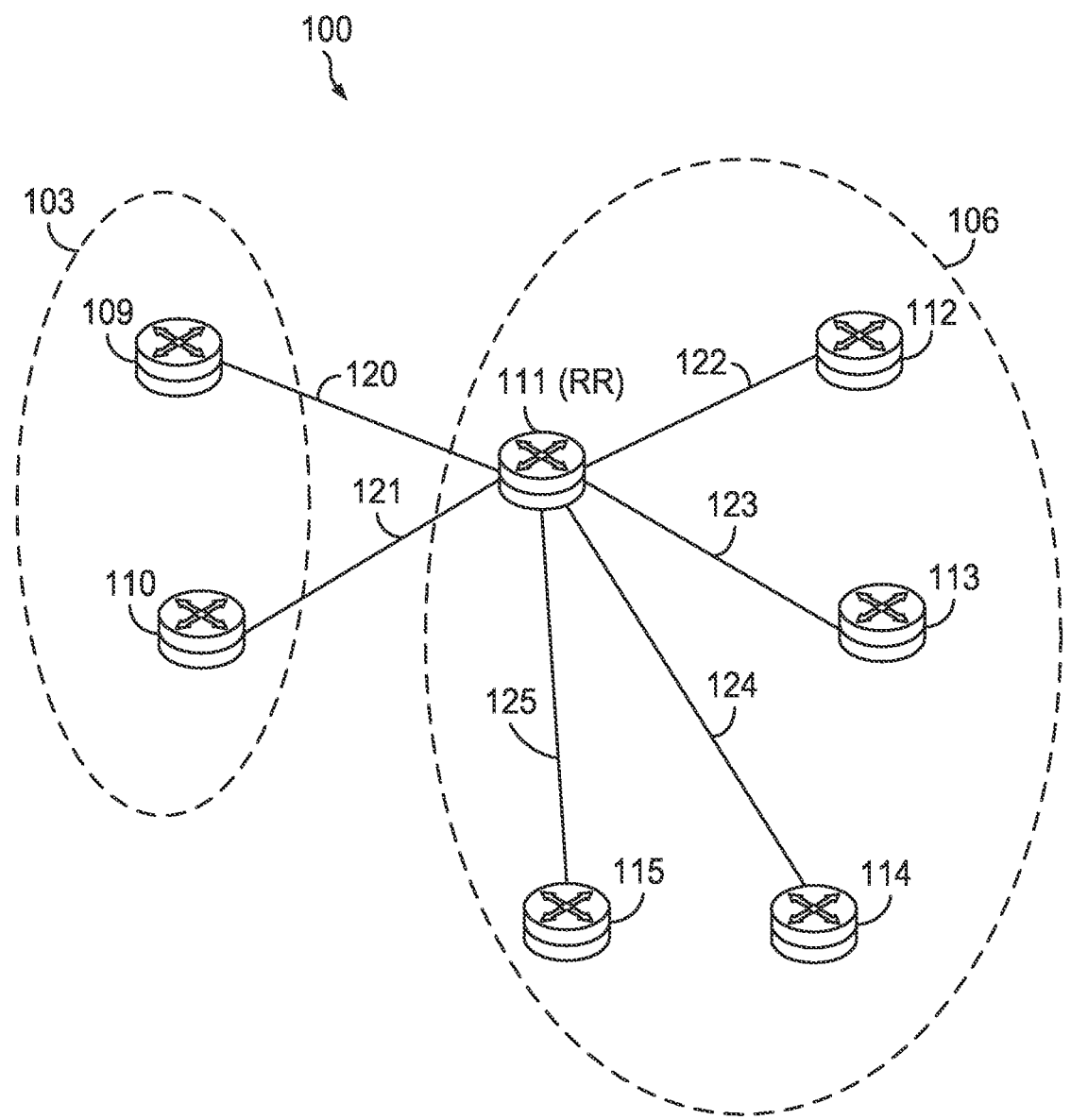
FIG. 1 is a diagram illustrating a communications system configured to implement controller Border Gateway Protocol (cBGP) according to various embodiments of the disclosure.

FIG. 1 is a diagram illustrating a communications system 100 configured to implement controller Border Gateway Protocol (cBGP) according to various embodiments of the disclosure. The communications system 100 includes two autonomous systems, AS 103 and AS 106. The AS 103 includes NEs 109 and 110, and the AS 106 comprises NEs 111-115. In FIG. 1, the NEs 109-115 are interconnected by links 120-125. Links 120 and 121 are inter-domain links connecting NEs within a different AS 103 and AS 106 (e.g., NE 111 to NEs 109 and 110). Links 122-125 are intra-domain links connecting NEs 111-115 within a single AS 106.

NEs 109-115 may be a physical device, such as a router, a bridge, a virtual machine, a network switch, or a logical device configured to perform switching and routing according to various routing protocols. As described herein, NEs 109-115 are configured to implement BGP.

Links 120-125 may be wired or wireless links or interfaces interconnecting each of the NEs 109-115 and configured to forward traffic according to various routing protocols, such as BGP. BGP is further defined in the Inter-Domain Routing Working Group (IDR WG) Request for Comments (RFC) 4271, entitled "A Border Gateway Protocol 4 (BGP-4)," by Y. Rekhter, et. al., dated January 2006 (hereinafter referred to as RFC 4271).

BGP sessions between NEs 109-115 in different ASs are referred as external BGP (eBGP) sessions or connections. For example, a BGP session between NE 111 and NE 109 or between NE 111 and NE 110 is an eBGP session. In contrast, BGP sessions between NEs of the same AS are referred to as internal BGP (iBGP) sessions or connections. For example, a BGP session between NE 111 and NE 112 and between NE 111 and NE 113 is an iBGP session. Two NEs 109-115 that have established an iBGP session are referred to as iBGP peers. Similarly, two NEs 109-115 that have established an eBGP session are referred to as eBGP peers.

In FIG. 1, NE 111 is designated as a BGP Route Reflector (RR) for the communications system 100, in which the NE 111 is directly or indirectly connected to the remaining NEs 109-110 and 112-115 of the communications system 100. In an embodiment, the NE 111 implemented as the RR may be configured to act as a controller, or central entity, of the communications system 100.

Within the communications system 100, the NEs 109-115 are configured to communicate four different types of messages that are specified for BGP Version 4, as described by RFC 4271: an OPEN message, an UPDATE message, a NOTIFICATION message, and a KEEPALIVE message. An OPEN message establishes a BGP session. Both sides of the BGP session negotiate session capabilities before establishing a BGP session using the OPEN message. In accordance with some embodiments, an OPEN message includes a version, AS number, hold timer, and some optional parameters. In particular, an OPEN message may optionally contain a capabilities type length value (TLV), indicating a capability of the NE 109-115 sending the OPEN message.

After a BGP session is established, the UPDATE and/or KEEPALIVE messages are selectively exchanged between session participants. UPDATE messages are central to BGP and contain all the necessary information that BGP uses to construct a loop-free forwarding path. The UPDATE message advertises any feasible routes, withdraws previously advertised routes, or can include both. The three basic blocks of an UPDATE message include Network Layer Reachability Information (NLRI), path attributes, and withdrawn (unfeasible) routes. For example, an UPDATE message includes a withdrawn routes length field (2 octets), a withdrawn routes field (variable length), a total path attribute length field (2 octets), a path attributes field (variable length), and a NLRI field (2 octets).

The NLRI field is encoded as one or more 2-tuples of the form <Length, Prefix>, where the Length parameter indicates the length in bits of the internet protocol (IP) address prefix and the Prefix parameter indicates an IP address prefix. For example, an NLRI field with the value <16, 192.200.0.0> indicates network reachability information for the route 192.200.0.0/16. The path attributes field comprises a set of parameters used to keep track of route-specific information such as ORIGIN, AS-PATH, NEXT-HOP, MULTI-EXIT-DISC, LOCAL-PREF, and so on.

Whenever an error is detected, a NOTIFICATION message is sent and the connection is closed. The NOTIFICATION message includes an error code indicating the specific type of error that is detected.

When an NE 109-115 implementing iBGP or eBGP generates or receives routing information, such as in an UPDATE message, the NE 109-115 forwards the routing information to neighboring NEs 109-115 that also implement BGP. For example, when NE 111 transmits an UPDATE message carrying routing information of a certain path toward a destination to NE 112, NE 112 is first configured to update a local routing table based on the UPDATE message when applicable to the NE 112. Subsequently, NE 112 forwards the UPDATE message based on the local routing table and policy to neighboring BGP peers. The neighboring BGP peers that receive the UPDATE message similarly process the UPDATE message to determine whether the local routing table needs to be updated based on the routing information carried in the UPDATE message and then forwards the UPDATE message based on the local routing table and policy to neighboring peers.

However, often times, NEs 109-115 (or BGP peers) receive routing information via BGP messages, without having any use or need for the routing information. Therefore, these NEs 109-115 that receive unwanted routing information merely discard the routing information or forward the routing information to other NEs 109-115, which may also not have any use or need for the routing information.

For this reason, NEs 109-115 implementing iBGP or eBGP flood network resources with these messages carrying routing information, even though several of the NEs 109-115 in the communications system 100 simply ignore or discard the message. In this way, communication systems implementing BGP, either iBGP and/or eBGP, typically incur a large amount of unnecessary overhead.

Disclosed herein are embodiments directed to a modified, lightweight version of BGP, referred to herein as cBGP, in which NEs that have established a cBGP session (referred to herein as cBGP NE) may only be permitted to communicate a particular type of information. In an embodiment, an NE 111 establishes a cBGP session with NEs 114 and 115. NEs 111 and 114 may be referred to herein as cBGP peers due to the cBGP session established between NE 111 and NE 114. Similarly, NEs 111 and 115 may be referred to herein as cBGP peers due to the cBGP session established between NE 111 and NE 115.

In this embodiment, NE 111 may only be permitted to communicate control messages to the NEs 114 and 115 through the cBGP session. For example, the control messages may include instructions that are sent to the NEs 114 and 115. Similarly, NEs 114 and 115 are only permitted to transmit responses to the instructions or status information to the NE 111 through the cBGP session. In an embodiment, route information, such as the route information carried in an UPDATE message, is prohibited from being communicated between NE 111 and NEs 114 and 115 through the cBGP sessions.

For example, in FIG. 1, NE 111 has established an eBGP session with NEs 109 and 110, an iBGP session with NEs 112 and 113, and a cBGP session with NEs 114 and 115. In this case, when NE 111 receives routing information from one of the eBGP peers, such as NE 109, NE 111 may forward the routing information to another eBGP peer (e.g., NE 110), or an iBGP peer (e.g., one of NEs 112 or 113). However, NE 111 is prohibited from forwarding the routing information to one of the cBGP peers (e.g., NEs 114 or 115).

When NE 111 receives routing information from an iBGP peer as a client, such as NE 112, NE 111 may forward the routing information to one of the eBGP peers (e.g., NEs 109 or 110), the other iBGP peer (e.g., NE 113), another iBGP client NE, or an iBGP non-client NE. However, NE 111 is prohibited from forwarding the routing information to one of the cBGP peers (e.g., NEs 114 or 115).

When NE 111 receives routing information from an iBGP peer as a non-client, such as NE 113, NE 111 may forward the routing information to one of the eBGP peers (e.g., NEs 109 or 110), an eBGP client, the other iBGP peer (e.g., NE 114), or an iBGP client. However, NE 111 is prohibited from forwarding the routing information to one of the cBGP peers (e.g., NEs 114 or 115) or a non-client NE. In some cases, when NE 111 receives routing information from another iBGP peer (e.g., NEs 112 and 113) or another eBGP peer (e.g., NEs 109 and 110), the routing information may be permitted to be forwarded to another BGP controller.

Unlike iBGP sessions and eBGP sessions, the cBGP sessions disclosed herein limit the amount of information that can be communicated between cBGP peers. The embodiments disclosed herein are advantageous in that cBGP sessions significantly reduce the amount of data that is transmitted within the communications system 100. In addition, the embodiments disclosed significantly reduce the amount of processing required to be performed by the cBGP peers within the communications system 100.

Figure 2:
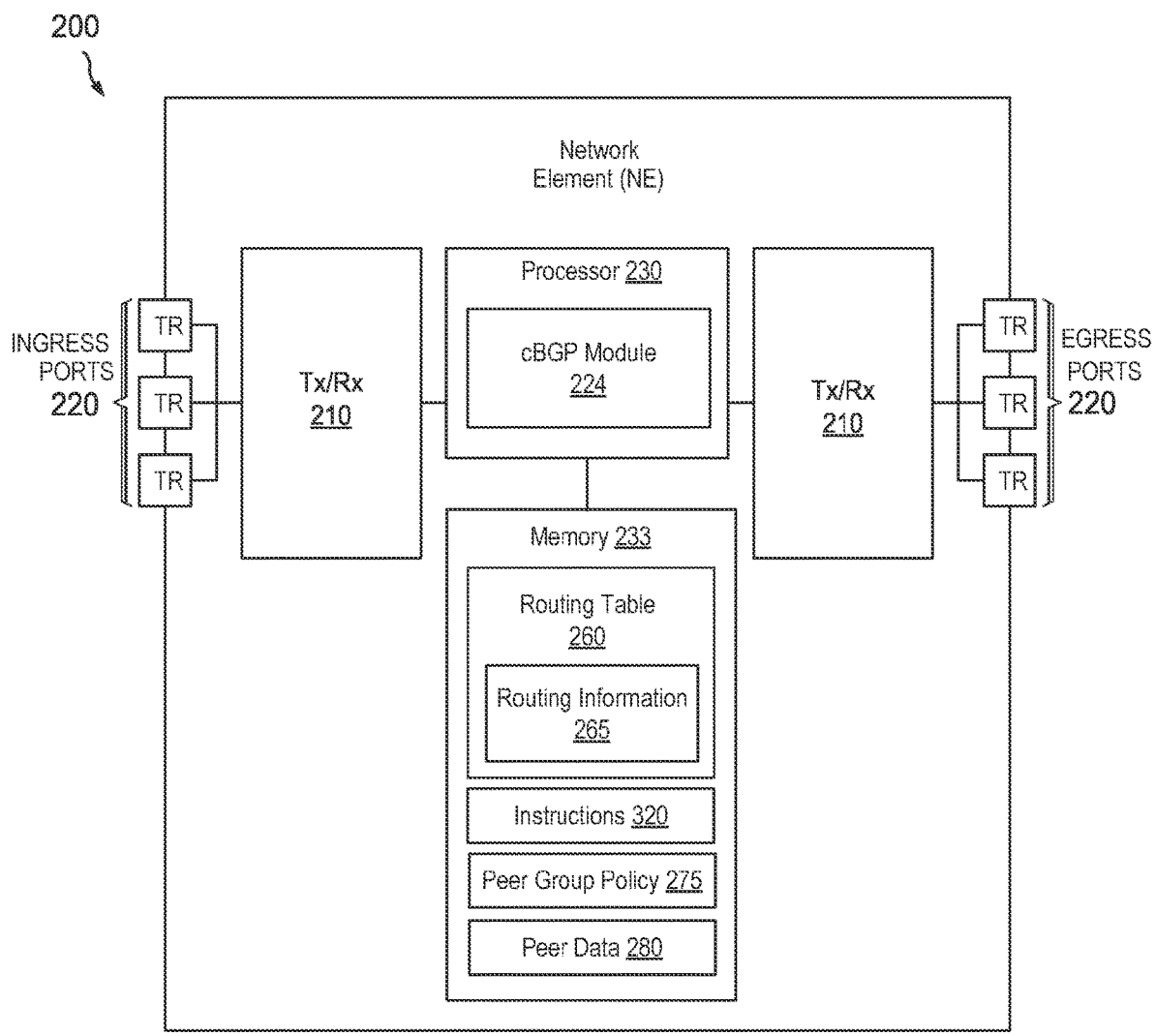
FIG. 2 is a diagram illustrating an NE configured to establish and implement cBGP according to various embodiments of the disclosure.

FIG. 2 is a schematic diagram of an NE 200 suitable for implementing cBGP according to various embodiments of the disclosure. In an embodiment, the NE 200 may be implemented as any one of NEs 109-115.

The NE 200 comprises ports 220, transceiver units (Tx/Rx) 210, a processor 230, and a memory 233. The processor 230 comprises a cBGP module 224. Ports 220 are coupled to Tx/Rx 210, which may be transmitters, receivers, or combinations thereof. The Tx/Rx 210 may transmit and receive data via the ports 220. Processor 230 is configured to process data. Memory 233 is configured to store data and instructions for implementing embodiments described herein. The NE 200 may also comprise electrical-to-optical (EO) components and optical-to-electrical (OE) components coupled to the ports 220 and Tx/Rx 210 for receiving and transmitting electrical signals and optical signals.

The processor 230 may be implemented by hardware and software. The processor 230 may be implemented as one or more central processing unit (CPU) and/or graphics processing unit (GPU) chips, logic units, cores (e.g., as a multi-core processor), field-programmable gate arrays (FPGAs), application specific integrated circuits (ASICs), and digital signal processors (DSPs). The processor 230 is in communication with the ports 220, Tx/Rx 210, and memory 233. The cBGP module 224 is implemented by the processor 230 to execute the instructions for implementing various embodiments discussed herein. For example, the cBGP module 224 is configured to permit transmission of a first type of message through a cBGP session and prohibit transmission of a second type of message through a cBGP session. The inclusion of the cBGP module 224 provides an improvement to the functionality of the NE 200. The cBGP module 224 also effects a transformation of NE 200 to a different state. Alternatively, the cBGP module 224 is implemented as instructions stored in the memory 233.

The memory 233 comprises one or more of disks, tape drives, or solid-state drives and may be used as an over-flow data storage device, to store programs when such programs are selected for execution, and to store instructions and data that are read during program execution. The memory 233 may be volatile and non-volatile and may be read-only memory (ROM), random-access memory (RAM), ternary content-addressable memory (TCAM), and static random-access memory (SRAM).

In an embodiment, the memory 233 is configured to store a routing table 260 comprising routing information 265. For example, routing information 265 includes information describing nodes or links along a path or tunnel to a destination. The routing table 260 includes routing information 265 for many different paths or tunnels. In an embodiment, the memory 233 is further configured to store instructions 320, which are messages used to instruct another NE in a communications system 100. In an embodiment, the instructions 320 are permitted to be communicated through a cBGP session. In an embodiment the memory 233 is further configured to store a peer group policy 275 and peer data 280. A peer group policy 275 indicates a type of peer data 280 that can be shared between NEs of a peer group, as will be further described below with reference to FIGS. 6 and 7.

It is understood that by programming and/or loading executable instructions onto the NE 200, at least one of the processor 230 and/or memory 233 are changed, transforming the NE 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 3:
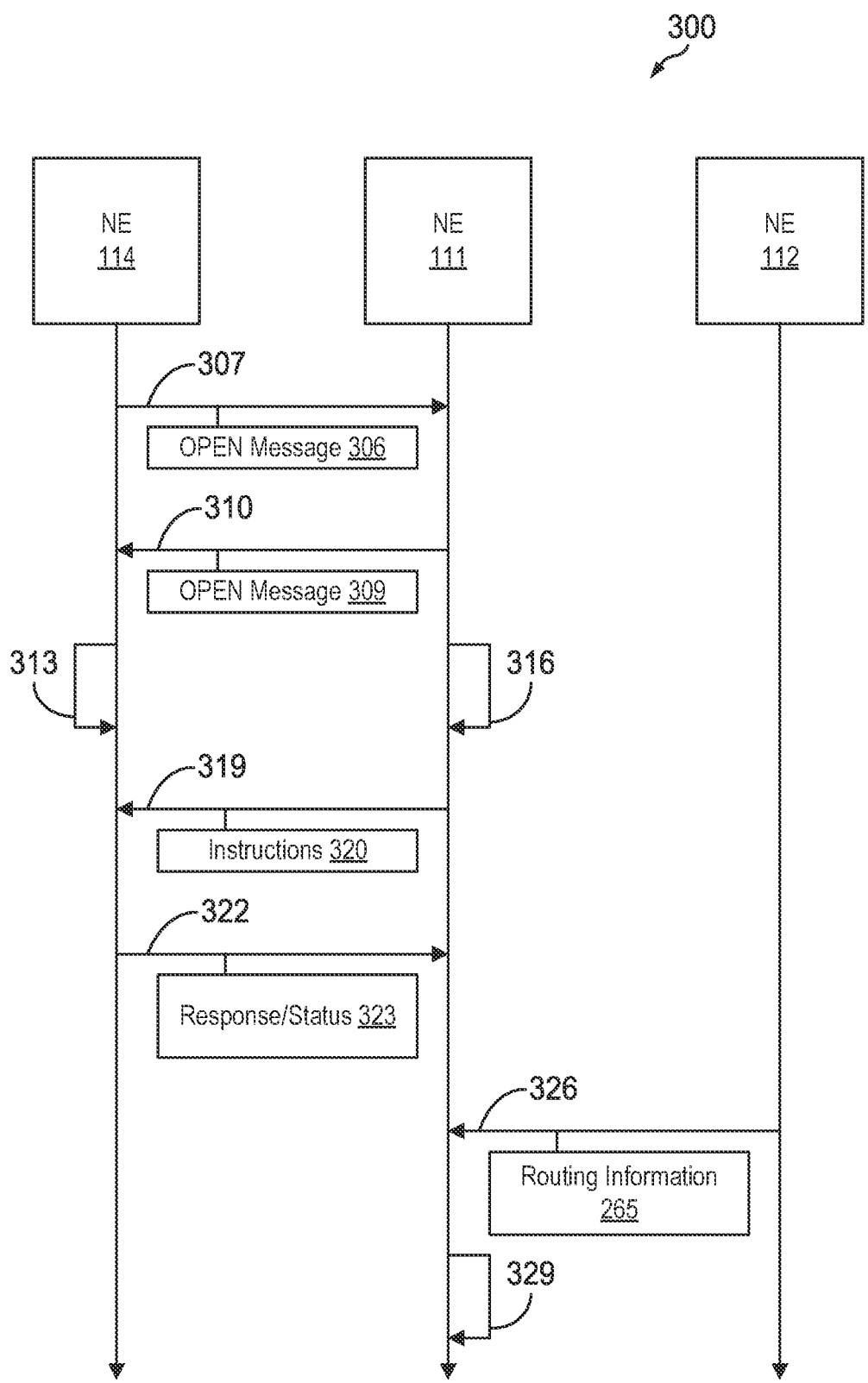
FIG. 3 is a message sequence diagram illustrating a method of establishing and implementing a cBGP session in the communications system of FIG. 1 according to various embodiments of the disclosure.

FIG. 3 is a message sequence diagram illustrating a method 300 of establishing and implementing a cBGP session in the communications system 100 according to various embodiments of the disclosure. Method 300 is implemented by NEs 109-115 in the communications system 100, such as NE 111, NE 112, and NE 114. In an embodiment, NE 111 may be implemented as a controller or the RR of the communications system 100. Method 300 is performed after an iBGP session as already been established between NE 111 and 112, and after a Transmission Control Protocol (TCP) three-way handshake has been completed between NE 111 an NE 114.

Upon completion of the TCP three-way handshake, NEs 111 and 114 attempt to establish a cBGP session using OPEN messages 306 and 309. At step 307, NE 114 populates and transmits an OPEN message 306 to NE 111. The OPEN message 306 includes information describing that NE 114 should be negotiated and accepted by NE 111 before establishing a cBGP session between NE 111 and NE 114. An OPEN message 306 includes a version of BGP that NE 114 is capable of implementing, an AS number of NE 114, a hold down timer indicating a proposed number of seconds between messages, a BGP identifier indicating an identifier of the NE 114, and one or more optional parameters. In an embodiment, the OPEN message 306 indicates whether NE 114 is capable of establishing a cBGP session. For example, the OPEN message 306 may include an optional capabilities field that includes a code indicating whether NE 114 is capable of establishing a cBGP session. In an embodiment, the capabilities field also indicates whether or not NE 114 is implemented or acting as the controller. As NE 114 is not implemented as the controller in this example, the capabilities field may indicate that NE 114 is not the controller.

At step 310, NE 111 populates and transmits an OPEN message 309 to NE 114. The OPEN message 309 is similar to the OPEN message 306, except that the OPEN message 309 includes information describing NE 111. The OPEN message 309 includes a version of BGP that NE 111 is capable of implementing, an AS number of NE 111, a hold down timer indicating a proposed number of seconds between messages, a BGP identifier indicating an identifier of the NE 111, and one or more optional parameters. In an embodiment, the OPEN message 309 indicates whether NE 111 is capable of establishing a cBGP session. For example, the OPEN message 309 may include an optional capabilities field that includes a code indicating whether NE 111 is capable of establishing a cBGP session. In an embodiment, the capabilities field also indicates whether or not NE 111 is implemented or acting as the controller. As NE 111 is implemented as the controller in this example, the capabilities field may indicate that NE 111 is the controller.

At steps 313 and 316, the NEs 114 and 111 determine whether or not to establish a cBGP session between NEs 114 and 111 based on the information contained in the OPEN messages 306 and 309. In particular, at step 313, NE 114 determines whether the information and capabilities sent in the OPEN message 306 from NE 111 matches, or is compatible with, the capabilities and features of NE 114. Similarly, at step 316, NE 111 determines whether the information and capabilities sent in the OPEN message 309 from NE 114 matches, or is compatible with, the capabilities and features of NE 111.

In response to the features and capabilities of both NEs 111 and NE 114 being compatible, NEs 111 and 114 establish a cBGP session between NEs 111 and 114. In contrast, when the features and capabilities of both NEs 111 and 114 are not compatible, a cBGP session cannot be established between NEs 111 and 114.

After establishing a cBGP session between NEs 111 and 114, certain types of information are permitted to be communicated through the cBGP session, while other types of information are prohibited from being communicated through the cBGP session. In an embodiment, control messages are permitted to be communicated through the cBGP session. For example, control messages such as instructions and/or status updates are permitted to be communicated through a cBGP session.

In FIG. 3, at step 319, NE 111 transmits instructions 320 to NE 114. For example, the instructions 320 may be a UPDATE message with a Control Information Attribute containing an Assign Adjacency Segment Identifier (SID) to Link Instruction sub-TLV, which instructs NE 114 to assign an adjacency SID to a link. The adjacency SID and the link are represented in the sub-TLVs shown below with reference to FIGS. 10B and 10E. An example of an instruction 320 indicating that the NE 114 should assign an adjacency SID to a link is represented in the sub-TLV referenced below in FIG. 11A.

In response to receiving the UPDATE message, NE 114 transmits a response or status 323 back to NE 111, as step 322. For example, the response or status 323 indicates the status or result of the execution of the instruction included in the UPDATE message. In one embodiment, the response or status 323 is another UPDATE message with a Control Information Attribute containing a Status TLV, which indicates whether the execution of the instruction is successful. An example of a response or status 323 indicating whether the instruction 320 was successfully performed is represented in the sub-TLV referenced below in FIG. 12.

In an embodiment, only control messages that do not contain routing information are permitted to be transmitted through a cBGP session. Routing information refers to information describing a path to a destination in the communications system 100 or the network. For example, routing information may include labels, addresses, or identifiers of certain NEs along a path to a destination.

In one embodiment, NE 111 does not receive messages with routing information from NE 114 and does not send messages with routing information 265 to NE 114 because NEs 111 and 114 participate in a cBGP session. For example, NE 111, acting as the RR and controller, does not send a message with routing information 265 to NE 114 after receiving the message from NE 112, which has an iBGP session with NE 111.

For example, in FIG. 3, NE 111 has already established an iBGP session with NE 112, through which messages containing routing information 265 are permitted to be transmitted. At step 326, NE 112 transmits an UPDATE message containing routing information 265 to NE 111, and NE 111 receives the UPDATE message. In BGP, NE 111 is configured to distribute this UPDATE message to connected BGP peers, such as NE 114. However, since NE 111 has established a cBGP session with NE 114, NE 111 is prohibited from forwarding the UPDATE message containing routing information 265 to NE 114. That is, NE 111 does not send the UPDATE message containing the routing information 265 to NE 114.

In a similar fashion, routing information 265 learned by NE 114 is prohibited from being distributed or forwarded to NE 111, with which a cBGP session has been established. In some embodiments, when a NE 111 or 114 receives routing information 265, NEs 111 and 114 are prohibited from forwarding or distributing the routing information 265 to any other cBGP peers.

In some embodiments, iBGP peers and eBGP peers are prohibited from transmitting UPDATE messages to NEs 114, or any other NEs with which a cBGP session has been established. In the case that NE 114 receives an UPDATE message, NEs 114 is configured to discard, drop, or ignore the UPDATE message. Accordingly, the cBGP session established between NEs 111 and 114 prevent unnecessary traffic from being forwarded through the communications system 100 and clogging network resources.

Figure 4:
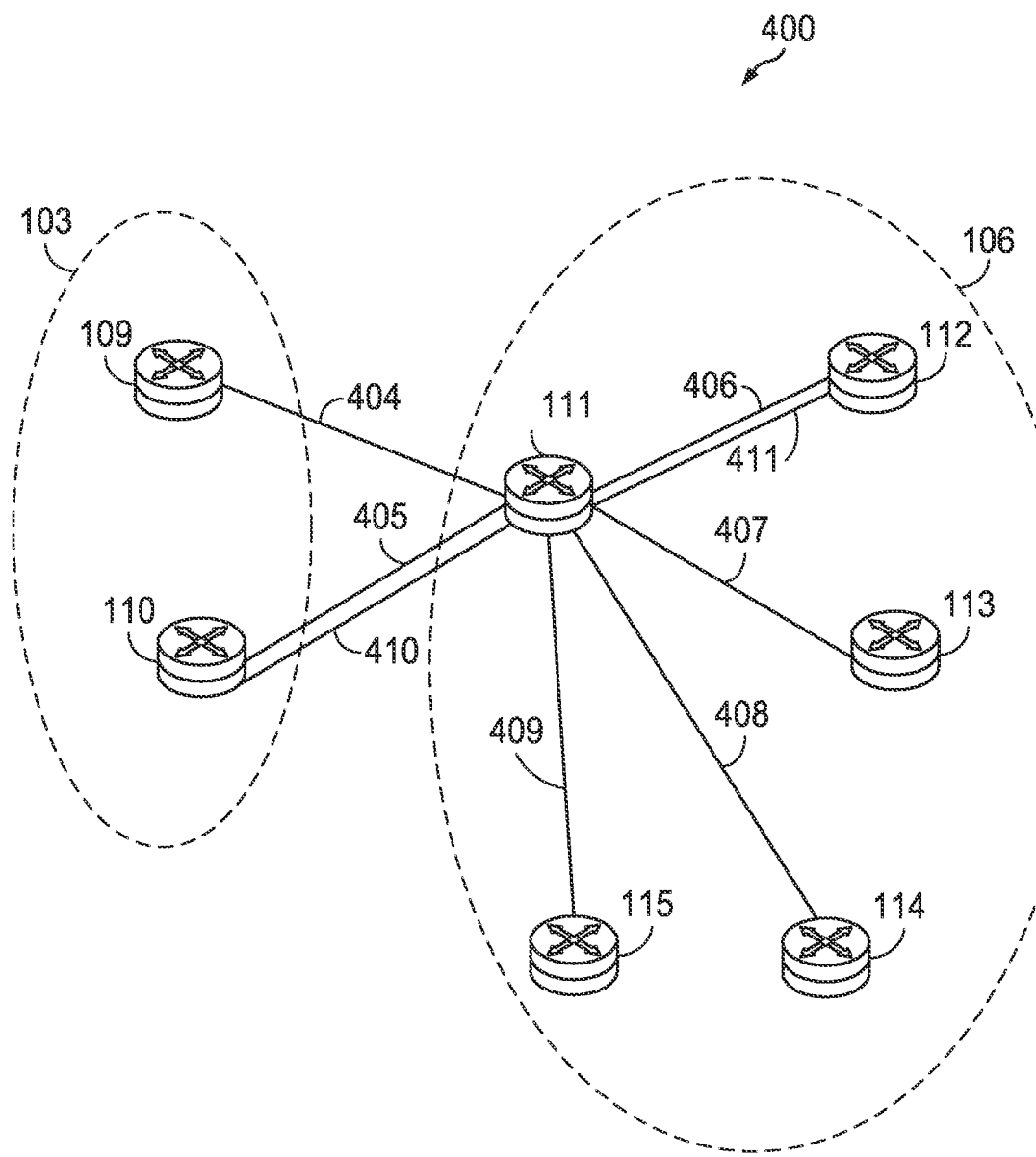
FIG. 4 is a diagram illustrating another communications system configured to establish and implement cBGP according to various embodiments of the disclosure.

FIG. 4 is a diagram illustrating a communications system 400 configured to implement cBGP according to various embodiments of the disclosure. Communications system 400 of FIG. 4 is similar to communications system 100 of FIG. 1, except that the communications system 400 of FIG. 4 shows the different BGP session 404-411 established between NE 111 and NEs 109-110 and 112-115. In addition, the communications system 400 of FIG. 4 shows that different types of BGP sessions may be established between a single pair of NEs.

Similar to the communications system 100 of FIG. 1, in the communications system 400 of FIG. 4, NE 111 is implemented as the controller and the RR of the communications system 400. In this way, NE 111 has established different types of BGP sessions or connections with the other NEs 109-110 and 112-115 in the communications system 400. In particular, NE 111, positioned within AS 106, has established separate eBGP sessions with both NEs 109 and 110, both of which are positioned within AS 103. As shown in FIG. 4, NE 111 has established an eBGP session 404 with NE 109 and an eBGP session 405 with NE 110.

NE 111 has also established separate iBGP sessions with NEs 112, 113, 114, and 115, all of which are positioned within the same AS 106. As shown in FIG. 4, NE 111 has established an iBGP session 406 with NE 112, an iBGP session 407 with NE 113, an iBGP session 408 with NE 114, and an iBGP session 409 with NE 115.

In some embodiments, NE 111 is configured to establish cBGP sessions with some of the NEs 110 and 112 with which other BGP session types have already been established. As shown by FIG. 4, NE 111 has already established an eBGP session 405 with NE 110 and an iBGP session 406 with NE 112. In an embodiment, NE 111 is configured to additionally establish a cBGP session with NEs 110 and 112. In particular, NE 111 is configured to establish a cBGP session 410 with NE 110 and a cBGP session 411 with NE 112.

NE 111 additionally establishes the cBGP sessions 410 and 411 in two different manners. In the first manner, NE 111 establishes the cBGP sessions 410 and 411 separately from the existing BGP sessions. For example, NE 111 establishes cBGP session 410 with NE 110 separately, for example, as a separate tunnel, from the existing eBGP session 405. In this example, different types of messages are communicated between NEs 111 and 110 through the different types of BGP sessions (e.g., eBGP session 405 and cBGP session 410). In an embodiment, a first type of message is permitted to be communicated through the cBGP session 410, in which the first type of message is a control message excluding routing information 265. In this embodiment, a second type of message including routing information 265 should be communicated through the eBGP session 405.

For example, when NE 111 receives an UPDATE message from another BGP peer, NE 111 may first determine a type of message of the UPDATE message based on the format of the UPDATE message. In response to determining that the UPDATE message contains routing information 265, NE 111 determines that the UPDATE message should be forwarded to NE 110 through the eBGP session 405, not the cBGP session 410. In this case, NE 111 transmits the UPDATE message to NE 110 through the eBGP session 405.

In contrast, when NE 111 sends an instruction to the NE 110, NE 111 first determines a type of message of the instruction. In response to determining that the instruction is a control message that does not contain routing information 265, NE 111 determines that the instruction should be forwarded to NE 110 through the cBGP session 410. In this case, NE 111 transmits the instruction to NE 110 through the cBGP session 410.

Similar methodologies are utilized when NE 111 establishes a cBGP session 411 with an NE 112 separately from the existing iBGP session 406. For example, NE 111 establishes a cBGP session 411 with NE 112 separately, for example, as a separate tunnel, from the existing iBGP session 406. In this example, different types of messages are communicated between NEs 111 and 112 through the different types of BGP sessions (e.g., iBGP session 406 and cBGP session 411). In an embodiment, a first type of message is permitted to be communicated through the cBGP session 411, in which the first type of message is a control message excluding routing information 265. In this embodiment, a message including routing information 265 should be communicated through the iBGP session 406.

In a second manner of establishing a cBGP session, NE 111 establishes the cBGP sessions 410 and 411 by combining the cBGP sessions 410 and 411 with the existing eBGP session 405 and iBGP session 406. For example, instead of creating a separate tunnel for the new cBGP session 410, NE 111 creates a combined BGP session with NE 110 by adding the cBGP session 410 to the existing eBGP session 405. In this example, different types of messages are permitted to be communicated between NEs 111 and 110 through the combined BGP session. In this embodiment, a first type of message is permitted to be communicated through the combined BGP session, in which the first type of message is a control message excluding routing information 265. In this embodiment, a second type of message including routing information 265 is also permitted to be communicated through the combined BGP session.

Similar methodologies are utilized when NE 111 establishes a combined BGP session with an NE 112 with which an iBGP session 406 has already been established. For example, NE 111 establishes a combined BGP session with NE 112 by, for example, adding a cBGP session 411 to the existing iBGP session 406. In this example, different types of messages are permitted to be communicated between NEs 111 and 112 through the combined BGP session.

Accordingly, the embodiments disclosed herein enable cBGP sessions to be established flexibly with other NEs, regardless of whether other types of BGP sessions have already been established with the other NEs. When establishing cBGP sessions using the first manner, a cBGP session is separately and independently established from the other existing BGP session. In this first manner, the cBGP NE is configured to filter messages based on the type of message to determine which BGP session through which to transmit the message. When establishing cBGP sessions using the second manner, the cBGP session is combined with the existing BGP session. In this second manner, all types of messages may be transmitted through the combined BGP session.

Figure 5:
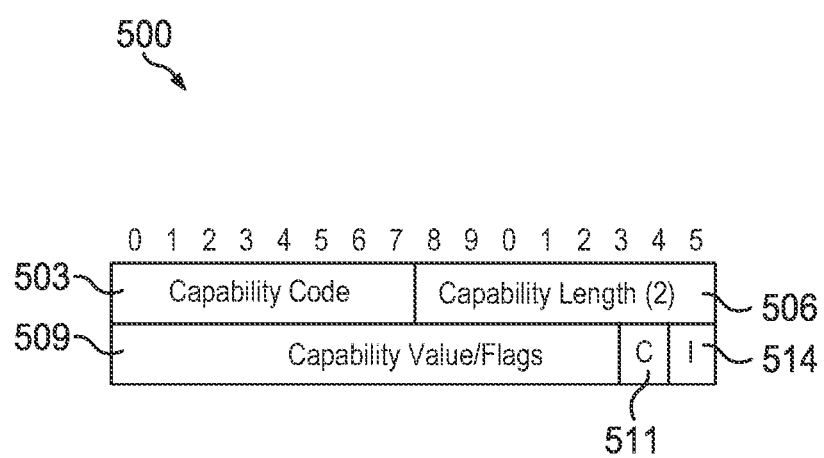
FIG. 5 is a diagram illustrating a capabilities type length value (TLV) sent by an NE in the communications system of FIG. 1 or FIG. 4 according to various embodiments of the disclosure.

FIG. 5 is a diagram illustrating a capabilities TLV 500 sent by an NE in the communications system 100 of FIG. 1 or the communications system 400 of FIG. 4 according to various embodiments of the disclosure. In an embodiment, the capabilities TLV 500 includes information indicating whether an NE 109-115 is capable of establishing a cBGP session with another NE 109-115. In an embodiment, the capabilities TLV 500 is included as an optional parameter in an OPEN message, similar to the OPEN messages 306 and 309 of FIG. 3. In another embodiment, the capabilities TLV 500 is a new and separate message transmitted between NEs 109-115 in a communications system 100 to indicate a respective capability of the NE 109-115.

In the embodiment shown in FIG. 5, the capabilities TLV 500 includes a capability code 503, a capability length 506, and a capability value 509. The capability code 503 is a one byte field carrying a code indicating whether the NE 109-115 sending the capabilities TLV 500 is capable of establishing a cBGP session with another NE 109-115. In an embodiment, the code is a value presenting whether the NE 109-115 is capable of establishing a cBGP session with another NE 109-115 or whether the NE 109-115 is not capable of establishing a cBGP session with another NE 109-115.

The capability length 506 is a one byte field indicating that the length of the capability value 509 is 2 bytes. The capability value 509 is a 2 byte field carrying various flags. In an embodiment, the capability value 509 carries a C flag 511 and an I flag 514. In an embodiment, the C flag 511 is set to indicate whether the NE 109-115 sending the capabilities TLV 500 acts as a controller of the communications system 100. For example, when the C flag 511 is set to 1, the C flag 511 indicates that the NE 109-115 sending the capabilities TLV 500 acts as the controller of the communications system 100. Similarly, when the C flag 511 is set to 0, the C flag 511 indicates that the NE 109-115 sending the capabilities TLV 500 does not act as the controller of the communications system 100.

In an embodiment, the I flag 514 is set to indicate whether the NE 109-115 sending the capabilities TLV 500 is configured to create a separate cBGP session or a combined BGP session, when applicable, as described above with reference to FIG. 4. For example, when the I flag 514 is set to 1, the NE 109-115 sending the capabilities TLV 500 is configured to create a cBGP session with another NE 109-115 that is separate and independent from any other existing BGP session. For example, the NE 109-115 sending the capabilities TLV 500 is configured to create a new cBGP session, by creating a separate tunnel or path, with the other NE 109-115. Similarly, when the I flag 514 is set to 0, the NE 109-115 sending the capabilities TLV 500 is configured to create a combined BGP session with another NE 109-115.

Figure 6:
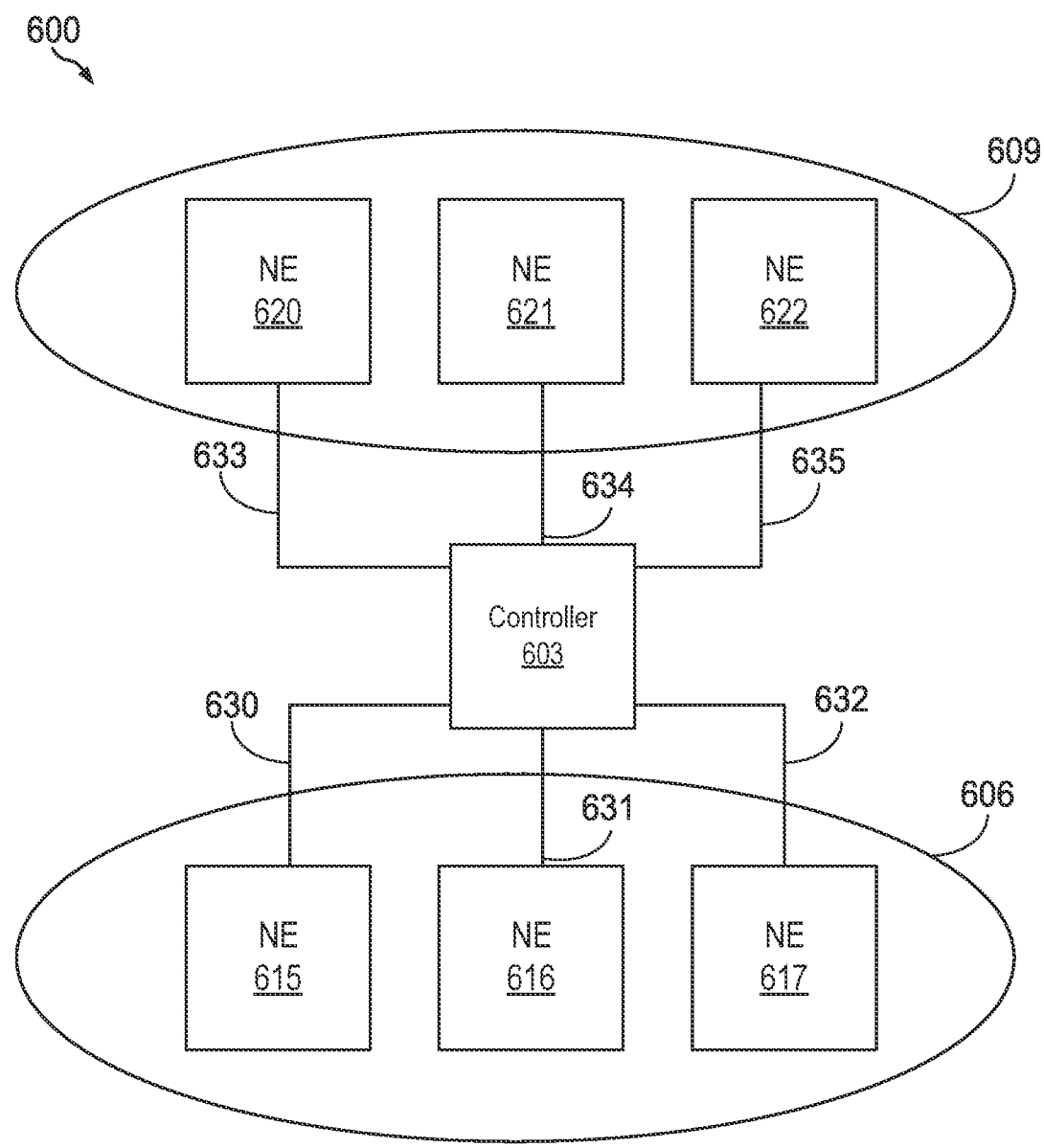
FIG. 6 is a diagram illustrating a communications system configured to implement cBGP peer session within a peer group according to various embodiments of the disclosure.

FIG. 6 is a diagram illustrating a communications system 600 configured to implement a cBGP peer session within a peer group according to various embodiments of the disclosure. In FIG. 6, the communications system 600 includes a controller 603 and two peer groups 606 and 609. The peer groups 606 and 609 refer to a set or group of NEs 615-617 and NEs 620-622 in the communications system 600 that share a similar characteristic or policy.

In FIG. 6, the peer group 606 includes NEs 615, 616, and 617, while peer group 609 includes NEs 620, 621, and 622. Within peer group 606, NEs 615-617 are grouped together based on a shared characteristic or policy. A shared characteristic or policy may include, for example, a shared tenant identifier (ID), a similar geographic district, a similar zone, a similar group name, a method of encryption or decryption, etc. For example, NEs 615-617 are associated with the same tenant, and thus, the same tenant identifier, even though NEs 615-617 may be located in geographically distinct regions. For this reason, NEs 615-617 are grouped together into a single peer group 606.

Similarly, within peer group 609, NEs 620-622 are grouped together based on a shared characteristic or policy. For example, NEs 620-622 may be associated with the same company name, and thus, may belong in the same peer group 609, even though NEs 620-622 are located in geographically distinct regions.

In an embodiment, NEs 615-617 and NEs 620-622 are similar to NEs 109-115 of the communications systems 100 and 400. In another embodiment, the NEs 615-617 and 620-622 are implemented as customer premises equipment (CPE), which are terminals or devices located at a premise of a subscriber and connected to a telecommunication circuit of a carrier.

NEs 615-617 and 620-622 are each coupled to the controller 603 via links 630-632 and 633-635, respectively. Links 630-632 and 633-635 may be similar to links 120-125, in that links 630-632 and 633-635 may be wired or wireless links or interfaces interconnecting each of the NEs 615-617 and 620-622 to the controller 603. Links 630-632 and 633-635 are configured to forward traffic according to various routing protocols, such as BGP (e.g., iBGP, eBGP, and cBGP).

In an embodiment, the controller 603 is similar to NE 111, in that the controller may act as the RR of the communications system 600. In another embodiment, the controller 603 may be a separate server or site external to the ASs included in the communications system 600.

In some embodiments, the controller 603, NEs 615-617, and 620-622 are configured to selectively communicate certain types of information by establishing cBGP sessions between members of the peer groups 606 and 609 and the controller 603. In an embodiment, the controller 603 establishes cBGP session with NEs 615-617. The controller 603 separately establishes a cBGP session with NEs 620-622.

After the cBGP session has been established between the controller 603 and members of the peer groups 606 and 609, the controller 603 determines whether to forward or distribute information received from other member NEs 615-617 and 620-622 within a peer group 606 and 609. In this embodiment, certain types of information may be permitted to be forwarded or distributed to NEs 615-617 and 620-622 within the same peer group 606 and 609.

For example, information that may be shared within member NEs 615-617 and 620-622 of a peer group 606 and 609 include private addresses of NEs 615-617 and 620-622 within the same peer group 606 and 609, port addresses for ports of particular NEs 615-617 and 620-622 within the same peer group 606 and 609, security related information for NEs 615-617 and 620-622 within the same peer group 606 and 609, information describing Ethernet virtual private networks (EVPNs) for NEs 615-617 and 620-622 within the same peer group 606 and 609, information describing intelligent virtual private networks (IVPNs) for NEs 615-617 and 620-622 within the same peer group 606 and 609, etc. For example, when the communications system 600 is a software defined wide area network (SD-WAN), information that may be shared within member NEs 615-617 and 620-622 of a peer group 606 and 609 includes end node wide area network (WAN) auto discovery information, such as the SD-WAN node private address, WAN ports or addressees registered with an SD-WAN controller, etc. In this example, controller facilitated Internet Protocol Security (IPsec) associated information establishment among WAN ports are also shared within member NEs 615-617 and 620-622 of a peer group 606 and 609. In one embodiment, routing information 265 may also be shared between member NEs 615-617 and 620-622 of the same peer group 606 and 609.

In an embodiment, a network administrator or operator preconfigures the controller 603 to include identifiers, labels, or addresses of each of the NEs 615-617 and 620-622 within a particular peer group 606 and 609. In another embodiment, the controller 603 determines member NEs 615-617 and 620-622 of the peer group 606 and 609 intelligently based on characteristics or properties associated with the NEs 615-617 and 620-622. For example, the controller 603 may obtain the tenant identifiers for each NE 615-617 and then create the peer group 606 based on the matching tenant identifiers for NEs 615-617.

In an embodiment, the controller 603 distributes information based on peer group policies 275 defined by the network administrator or operator specifying the types of information that may be shared within member NEs 615-617 and 620-622 of the peer group 606 or 609. In another embodiment, the controller 603 may be configured to intelligently determine peer group policies 275 defining the types of information that may be securely shared between member NEs 615-617 and 620-622 of a peer group 606 or 609.

Figure 7:
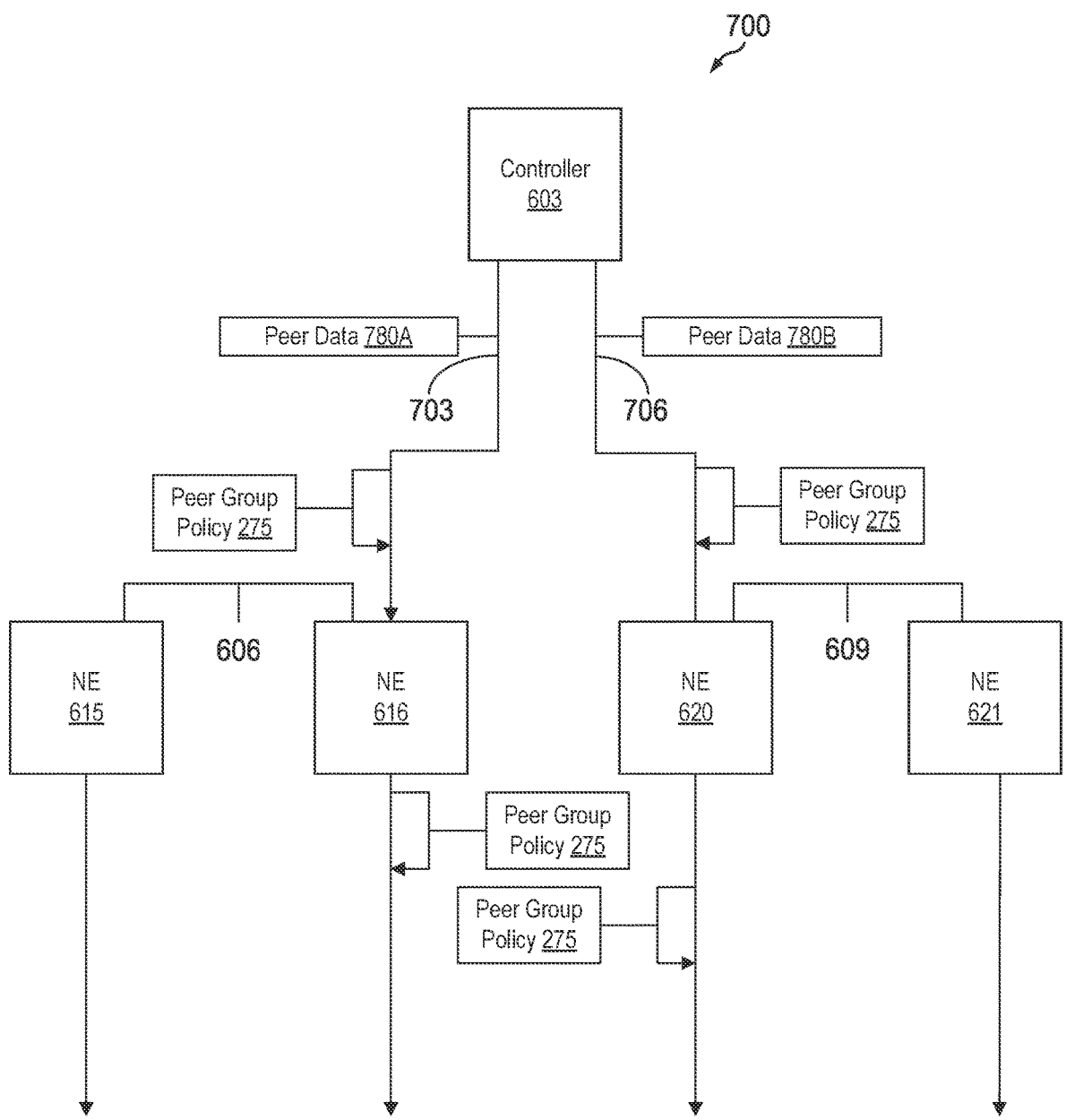
FIG. 7 is a message sequence diagram illustrating a method of implementing cBGP in the communications system of FIG. 6 according to various embodiments of the disclosure.

FIG. 7 is a message sequence diagram illustrating a method 700 of implementing cBGP in the communications system 600 of FIG. 6 according to various embodiments of the disclosure. Method 700 is implemented by NEs in the communications system 600, such as the controller 603 and NEs 615, 616, 620, and 621. Method 700 is performed after the controller 603 has established a cBGP session with NEs 615, 616, 620, and 621 and after the peer groups 606 and 609 are established. As described above, the peer group 606 includes NEs 615 and 616, while the peer group 609 includes NEs 620 and 621.

The controller 603 may obtain peer data 780A and 780B, either by generating the peer data 780A and 780B or receiving the peer data 780A and 780B from another BGP peer/NE. For example, the peer data 780A includes an address of the NE 617 from the peer group 606 (see FIG. 6), and the peer data 780B may include port information regarding NE 622 from peer group 609 (see FIG. 6).

Prior to transmitting the peer data 780A-B to other member NEs of the respective peer groups 606 and 609, the controller 603 determines whether the peer data 780A-B comprises a type of data that is permitted to be distributed or forwarded to other member NEs of the respective peer groups 606 and 609 based on a peer group policy 275 defined for each of the peer groups 606 and 609. In an embodiment, the peer group policies 275 indicate the type of data that may be shared between a respective peer group 606 and 609. In this embodiment, the controller 603 compares the peer data 780A-B with the respective peer group policy 275 for each peer group 606 and 609 to determine whether the peer data 780A-B is permitted to be shared.

When the peer group policy 275 for the peer group 606 indicates that address information is permitted to be shared with other NEs in the peer group 606, at step 703, the controller 603 transmits the peer data 780A to NE 616 of peer group 606. Notably, the controller 603 did not forward the peer data 780A to NEs 620 or 621, which are members of a different peer group 609. Similarly, when peer group policy 275 for the peer group 609 indicates that port information is permitted to be shared with other NEs in the peer group 609, at step 706, the controller 603 transmits the peer data 780B to NE 620 of peer group 609. Notably, the controller 603 did not forward the peer data 780B to NEs 615 or 616, which are members of a different peer group 606. In an embodiment, the NEs within the peer groups 606 and 609 also locally store the peer group policies 275 that are used to determine whether to share the peer data 780A-B.

Figure 8A:
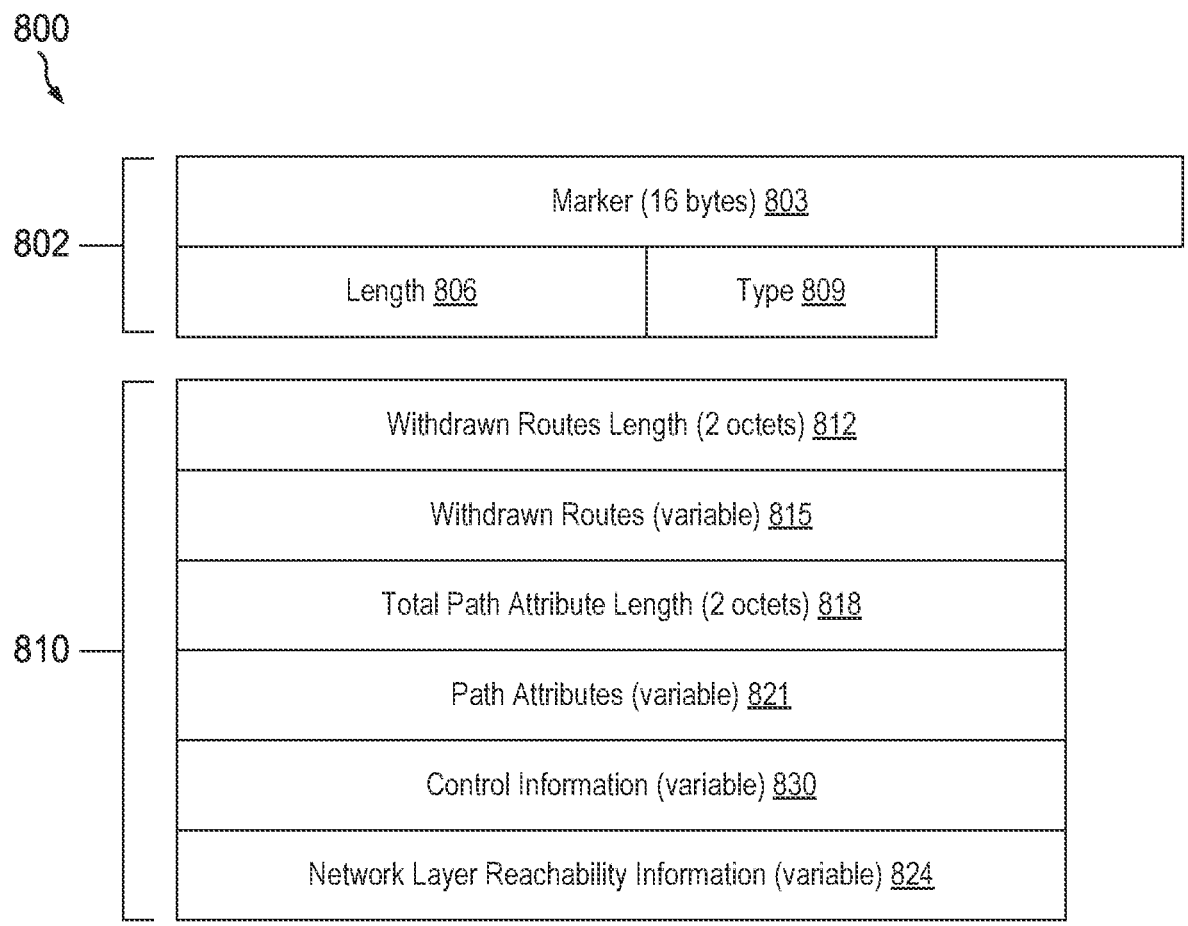
FIGS. 8A-C are diagrams illustrating an UPDATE message encoded based on BGP 4 and communicated during a cBGP session according to various embodiments of the disclosure.
Figure 8B:
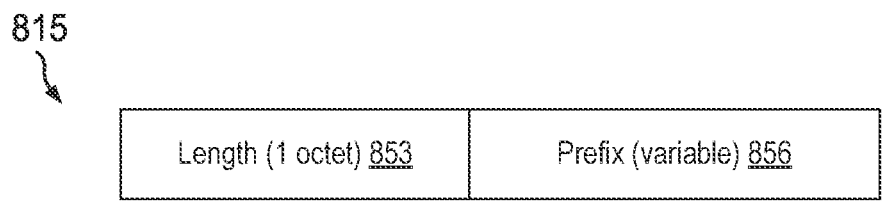
Figure 8C:
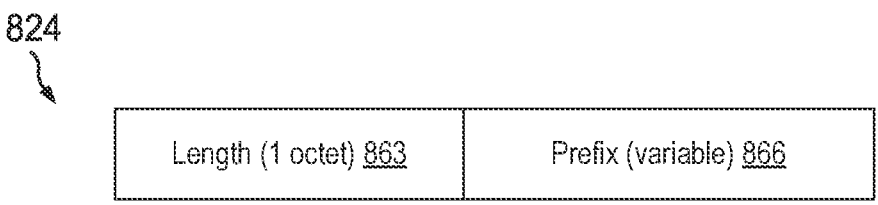

FIGS. 8A-C are diagrams illustrating an UPDATE message 800 encoded based on BGP 4 according to various embodiments of the disclosure. The UPDATE message 800 may be encoded similar to the UPDATE message described in the Network Working Group (NWG) Request for Comments (RFC) 4271 document, entitled "A Border Gateway Protocol 4 (BGP-4)," by Y. Rekhter, Ed., et. al., dated January 2006. As shown by FIG. 8, the UPDATE message 800 includes a header 802 and various attributes 810.

In an embodiment, the UPDATE message 800 may be transmitted by NE 111, for example, at step 319 of FIG. 3, or transmitted by the NE 114, for example, at step 322. With references to FIGS. 8-12, the term "node" may be used interchangeably with "NE."

The header 802 includes a marker 803, a length 806, and a type 809. The marker 803 is a 16-octet field included for compatibility and may be set to all ones. The length 806 is a 2-octet unsigned integer indicating the total length of the UPDATE message 800, including the header 802, in octets. The type 809 is a 1-octet unsigned integer indicating a type code of the UPDATE message 800 carrying the attributes 810, and in particular, the control information 830. In an embodiment, the type code is 2, which is the existing type code of the existing UPDATE message. When the UPDATE message is transmitted over a cBGP session, it contains control information 830. In another embodiment, the type code is a new number other than 2. This new number (i.e., new type code) indicates that the message is a UPDATE message containing control information 830.

The attributes 810 include details used to advertise feasible routes that share common path attributes to a peer, or to withdraw multiple unfeasible routes from service. As shown by FIG. 8, the attributes 810 include at least one of a withdrawn routes length 812, withdrawn routes 815, total path attribute length 818, path attributes 821, NLRIs 824, or control information 830. The withdrawn routes length 812 is a 2-octet unsigned integer indicating the total length of the withdrawn routes 815 in octets. The withdrawn routes 815 is a variable-length field that contains a list of IP address prefixes for the routes that are being withdrawn from the service. Each IP address prefix is encoded as a single 2-tuple of the form <length, prefix>.

FIG. 8B shows the 2-tuple form used to signal each IP address prefix in the withdrawn routes 815. The 2-tuple includes a length 853 1-octet field indicating the length in bits of the IP address prefix 856 field. The IP address prefix 856 field carries the IP address prefix.

The total path attribute length 818 is a 2-octet unsigned integer indicating the total length of the path attributes 821 in octets. The path attributes 821 is a variable length sequence of path attributes present in every UPDATE message 800, except for an UPDATE message that carries only withdrawn routes. Each path attribute 821 is reflected as a triple including an attribute type, length, and value. The NLRIs 824 is a variable length field containing a list of IP address prefixes. The reachability information in NLRIs 824 is encoded as one or more 2-tuples of the form <length, prefix>.

FIG. 8C shows the 2-tuple form used to signal each IP address prefix in the NLRIs 824. The 2-tuple includes a length 863 1-octet field indicating the length in bits of the IP address prefix 866 field. The IP address prefix 863 field carries the IP address prefix.

According to some embodiments, the attributes 810 includes the control information 830. In an embodiment, the instructions 320 and the response or status 323 described above with reference to FIG. 3 is carried in the control information 830 of the UPDATE message 800. In this embodiment, NEs or nodes that have established cBGP sessions with one another are only permitted to transmit UPDATE messages 800 carrying instructions 320 and/or the response or status 323 in the control information 830.

Figure 9:
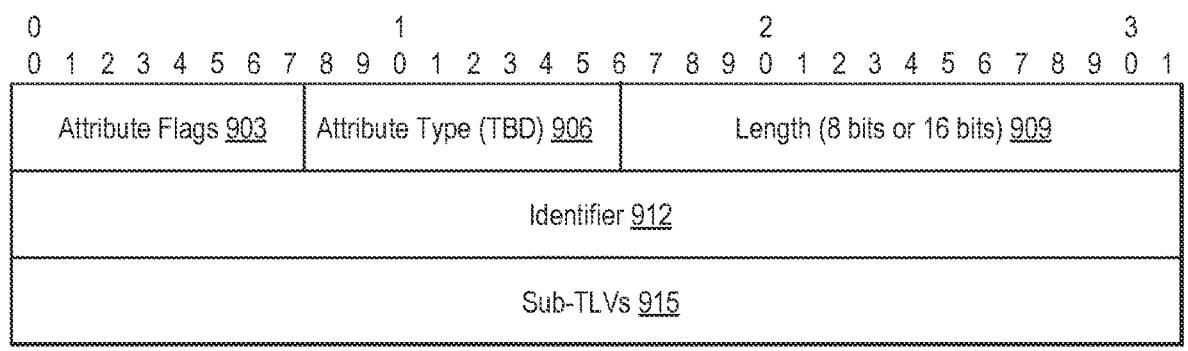
FIG. 9 is a diagram illustrating the control information included in the update message of FIG. 8 according to various embodiments of the disclosure.

FIG. 9 is a diagram illustrating the control information 830 included in the update message 800 according to various embodiments of the disclosure. The control information attribute 830 includes various fields, such as attribute flags 903, attribute type 906, length 909, identifier 912, and one or more sub-TLVs 915. The attribute flags 903 include 8 bits, in which each one is a flag representing information regarding the control information 830. In an embodiment, bit 0 is an optional bit indicating whether the control information 830 is optional or well-known. For example, bit 0 is set to 1 if the control information 830 is optional or set to 0 if the control information 830 is well-known. Bit 1 may be a transitive bit indicating whether the control information 830 is transitive or non-transitive. For example, bit 1 is set to 1 if the control information 830 is transitive or set to 0 if the control information 830 is non-transitive. Bit 2 may be a partial bit indicating whether the control information 830 is partial or complete. For example, bit 2 is set to 1 if the control information 830 is partial or set to 0 if the control information 830 is complete. Bit 3 is an extended length bit indicating whether the length 909 field of the control information 830 is 1 or 2 octets. For example, bit 3 is set to 0 if the length 909 of control information 830 is 1 octet or set to 1 if the length 909 of the control information 830 is 2 octets. In an embodiment, for the control information 830, bit 0 is set to 1 since the control information 830 is optional, and bit 1 is set to 0 since the control information 830 is non-transitive.

The attribute type 906 includes a code or value indicating that the attribute is the control information 830. The length 909 is an 8 bit or 16 bit value indicating the number of bytes in the control information 830. The identifier 912 is a 32 bit field identifying a set of instructions in the control information 830. The sub-TLVs 915 include one or more sub-TLVs 915 carrying information, instructions 320, or status 323, as will be further described in the examples below.

FIGS. 10A-E are diagrams illustrating examples of sub-TLVs 915A-E included in the control information attribute 830 according to various embodiments of the disclosure. The sub-TLVs 915A-E shown in FIGS. 10A-E carry information regarding nodes/NEs, links, or interfaces upon with the instructions 320 are to be performed.

FIG. 10A shows a node sub-TLV 915A indicating a node/NE receiving the instructions 320. The node sub-TLV 915A includes various fields, such as, the node type 1003, length 1006, and node IP address 1009. The node type 1003 carries a value indicating that the sub-TLV 915A is the node sub-TLV 915A. The length 1006 indicates either 4 bytes or 16 bytes, based on whether the node IP address 1009 caries an IPv4 address or an IPv6 address. When the node IP address 1009 carries an IPv4 address, the length 1006 indicates 4 bytes. When the node IP address 1009 carries an IPv6 address, the length 1006 indicates 16 bytes. The node IP address 1009 caries the IP address (either IPv4 address or IPv6 address) of the node/NE receiving the instructions 320.

FIG. 10B shows a link sub-TLV 915B indicating a link to which the instructions 320 are applied. The link sub-TLV 915B includes various fields, such as, the link type 1011, length 1012, link local IP address 1013, and link remote IP address 1014. The link type 1011 carries a value indicating that the sub-TLV 915B is the link sub-TLV 915B. The length 1006 indicates either 8 bytes or 32 bytes, depending on whether the IP addresses included in the link local IP address 1013 and the link remote IP address 1014 are IPv4 addresses (4 bytes) or IPv6 address (16 bytes). The link local IP address 1013 carries the local IP address of the link as either an IPv4 address or an IPv6 address. The link remote IP address 1014 carries the remote IP address of the link as either an IPv4 address or an IPv6 address.

FIGS. 10C and 10D are IP prefix sub-TLVs 915C and 915D indicating a prefix to which the instructions 320 are applied. In particular, FIG. 10C shows an IPv4 prefix sub-TLV 915C, carrying an IPv4 prefix, and FIG. 10D shows an IPv6 prefix sub-TLV 915D carrying an IPv6 prefix.

As shown by FIG. 10C, the IPv4 prefix sub-TLV 915C includes various fields, such as the IPv4 prefix type 1021, length 1022, prefix length 1023, and IPv4 prefix 1024. The IPv4 prefix type 1021 carries a value indicating that the sub-TLV 915C is the IPv4 prefix sub-TLV 915C. The length 1022 carries the length of the IPv4 prefix sub-TLV 915C excluding the type field 1021 and length 1022 field, which may be a variable length. The prefix length 1023 carries a length of the IPv4 prefix 1024, and the IPv4 prefix 1024 carries the IPv4 prefix.

As shown by FIG. 10D, the IPv6 prefix sub-TLV 915D includes various fields, such as the IPv6 prefix type 1031, length 1032, prefix length 1033, and IPv6 prefix 1034. The IPv6 prefix type 1031 carries a value indicating that the sub-TLV 915D is the IPv6 prefix sub-TLV 915D. The length 1032 carries the length of the IPv6 prefix sub-TLV 915D excluding the type field 1031 and length 1032 field, which may be a variable length. The prefix length 1033 carries a length of the IPv6 prefix 1034, and the IPv6 prefix 1034 carries the IPv6 prefix.

FIG. 10E shows an adjacency segment identifier (SID) sub-TLV 915E indicating an adjacency SID to which the instructions 320 are to be applied. The adjacency SID sub-TLV 915E includes various fields, such as, the adjacency SID type 1041, length 1042, flags 1043, weight 1044, reserved bits, and an SID, label, or index 1045. The adjacency SID type 1041 includes a value indicating that the sub-TLV 915E is the adjacency SID sub-TLV 915E. The length 1042 carries a length of the adjacency SID sub-TLV 915E excluding the type field 1041 and length 1042 field. The flags 1043 carry various bits or flags, such as a backup flag, a value index flag, a local/global flag, a group flag, or a persistent flag. The weight 1044 is used for load balancing purposes. The SID, label, or index 1045 carries a 4 octet index defining an offset in the SID/label space, a 3 octet local label, or an SID. Additional details regarding the SID sub-TLV 915E is further described in the Open Shortest Path First IGP Draft Document, entitled "OSPF Extensions for Segment Routing," by P. Psenak, et. al., dated Dec. 3, 2018.

FIGS. 10A-E show sub-TLVs 915A-E carrying information regarding nodes/NEs, links, or interfaces upon with the instructions 320 are to be performed. FIGS. 10A-E only shows a few examples of such sub-TLVs 915 that can be carried in the control information 830 of the UPDATE message 800. It should be appreciated that other sub-TLVs 915 carrying other types of information may otherwise be included in the control information 830 of the UPDATE message 800.

FIGS. 11A-B are diagrams illustrating sub-TLVs 915F-G including instructions 320 carried in the control information 830 according to various embodiments of the disclosure. The instructions 320 are instructions that are to be executed on a node/NE, link, prefix, or segment, as identified by, for example, one or more of the sub-TLVs 915A-E. In an embodiment, the sub-TLVs 915F-G including instructions 320 are permitted to be communicated during a cBGP session.

FIG. 11A shows an assign adjacency SID to link sub-TLV 915F according to various embodiments of the disclosure. The assign adjacency SID to link sub-TLV 915F includes an instruction 320 for a node/NE receiving the UPDATE message 800 to assign an adjacency SID to a link. The assign adjacency SID to link sub-TLV 915F includes various fields, such as, an assign adjacency SID link type 1103, a length field 1106, the adjacency SID sub-TLV 915E, and the link sub-TLV 915B. The assign adjacency SID link type 1103 carries a value indicating that the sub-TLV 915F is the assign adjacency SID to link sub-TLV 915F. The length 1106 carries a length of the assign adjacency SID to link sub-TLV 915F excluding the type field 1103 and length 1106 field. As described above, the adjacency SID sub-TLV 915E carries an SID, label, or index 1045, and the link sub-TLV 915B carries the link local IP address 1013 and the link remote IP address 1014. This information is used by the node/NE receiving the assign adjacency SID to link sub-TLV 915F to assign an adjacency SID, identified in the assign adjacency SID to link sub-TLV 915F, to a link, which is also identified in the assign adjacency SID to link sub-TLV 915F.

FIG. 11B shows flow redirect sub-TLV 915G according to various embodiments of the disclosure. The flow redirect sub-TLV 915G includes an instruction 320 for a node receiving the UPDATE message 800 to redirect a data flow. The flow redirect sub-TLV 915G includes various fields, such as, a flow redirect type 1153, a length field 1156, an indirection ID 1159, and a flow specification 1161. The flow redirect type 1153 carries a value indicating that the sub-TLV 915G is the flow redirect sub-TLV 915G. The length 1106 carries a length of the flow redirect sub-TLV 915G excluding the type field 1153 and length 1156 field. The indirection ID 1159 identifies a tunnel by which traffic should be redirected. In one embodiment, the indirection ID 1159 is 32 bits. The flow specification 1161 describes the traffic that should be redirected through the tunnel identified by the indirection ID 1159. In one embodiment, the flow specification 1161 is a link sub-TLV 915B, which indicates that the flow is the traffic from the link given by the link sub-TLV. In another embodiment, the flow specification 1161 is an IPv4 prefix sub-TLV 915C, which describes a traffic flow. This information is used by the node/NE receiving the flow redirect sub-TLV 915G to redirect the traffic described by the flow specification 1161 to the tunnel identified in the indirection ID 1159.

FIG. 12 is a diagram illustrating a status sub-TLV 915H including a response or status 323 carried in the control information 830 according to various embodiments of the disclosure. The status sub-TLV 915H is populated in a new UPDATE message 800 carrying information indicating whether the node receiving the first UPDATE message 800 successfully performed the instruction 320 carried in the first UPDATE message 800. The status sub-TLV 915H includes various fields, such as the status type 1203, the length 1206, reserved bits, status brief (SB) 1212, error code 1215, and a reason if failure occurs 1217. The status type 1203 carries a value indicating that the sub-TLV 915H is the status sub-TLV 915H. The length 1206 carries a length of the status sub-TLV 915H excluding the type field 1203 and length 1206 field. The SB 1212 includes a value indicating whether the instructions 320 were successfully performed. For example, SB 1212 may be set to 1 if the instructions 320 were successfully performed, 2 if the instructions 320 were not successfully performed or failed, and 3 if the instructions 320 were only partially performed. The error code 1215 may carry an error code or value when the instruction 320 was unable to be successfully performed identifying a predetermined reason as to why the instruction 320 instruction 320 was unable to be successfully performed. The reason if failure occurs 1217 is an optional field that may carry additional information describing reasons why the instruction 320 was unable to be successfully performed.

In an embodiment, during a cBGP session, when a node/NE receives a first UPDATE message 800 containing control information 830, in which the control information 830 carries an instruction 320, the node/NE may first attempt to perform the instruction 320. For example, the control information 830 may include the assign adjacency SID to link sub-TLV 915F. The node/NE may attempt to assign an adjacency SID, identified in the assign adjacency SID to link sub-TLV 915F, to a link, which is also identified in the assign adjacency SID to link sub-TLV 915F. The node may then populate a new (or second) UPDATE message 800 with control information 830 including a status sub-TLV 915H indicating whether the adjacency was properly assigned and the identifier 912 which is from the control information 830 in the first UPDATE message 800. In this manner, the cBGP session permits UPDATE messages 800 carrying control information 830 to be communicated amongst NEs or nodes that have established a cBGP session. In one embodiment, only UPDATE messages 800 carrying the control information 830, and no other attributes 810, are permitted to communicated amongst NEs or nodes that have established a cBGP session. In another embodiment, only UPDATE messages 800 carrying the control information 830 are permitted to communicated amongst NEs or nodes that have established a cBGP session, regardless of whether the UPDATE message 800 includes other attributes 810.

Figure 13:
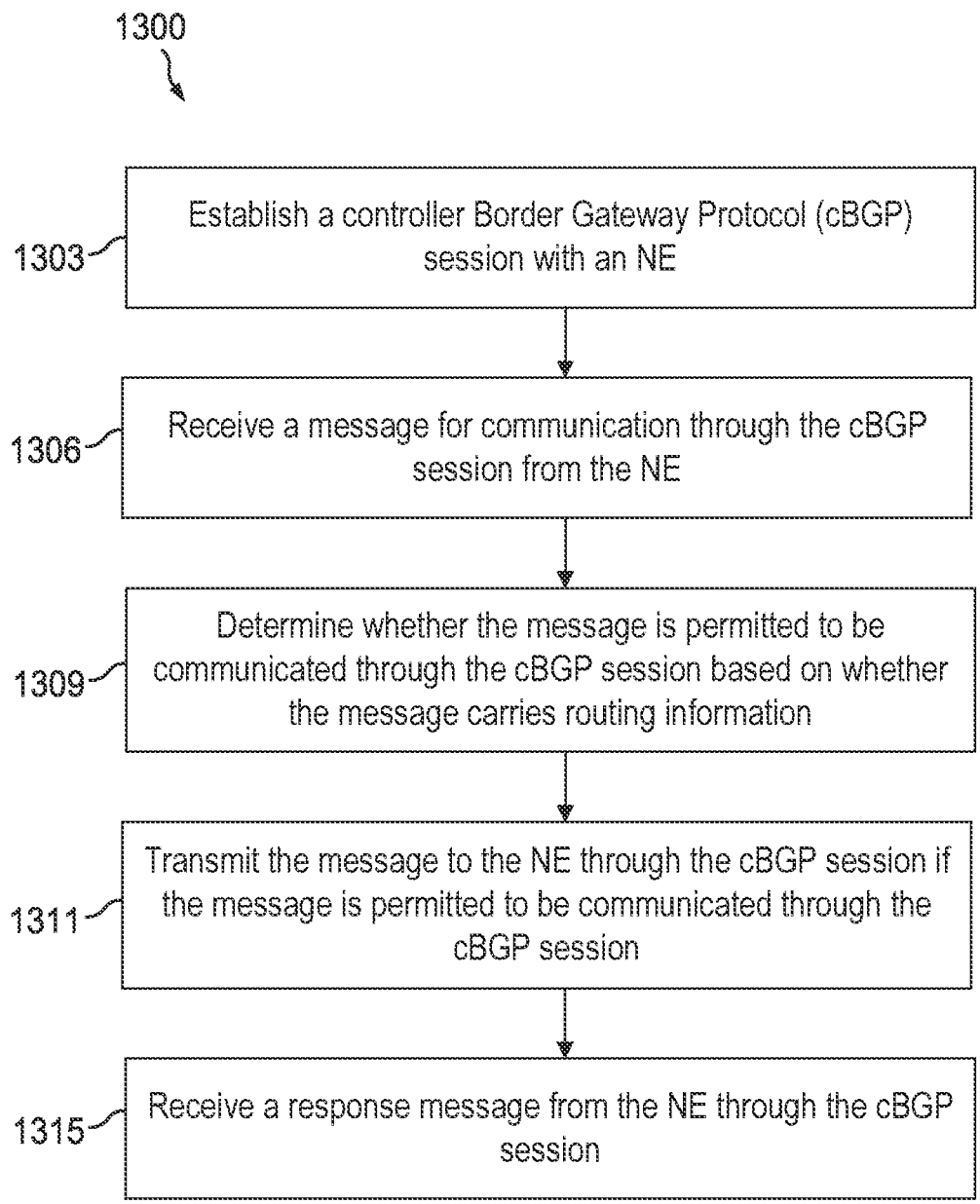
FIG. 13 is a flowchart illustrating a method of establishing a cBGP session and communicating data through a cBGP session according to various embodiments of the disclosure.

FIG. 13 is a flowchart illustrating a method 1300 of establishing a cBGP session and communicating data through a cBGP session according to various embodiments of the disclosure. Method 1300 may be implemented by a controller, such as NE 111, NE 200, or 603 of the communications systems 100, 400, or 600. Method 1300 may be implemented after the controller has established a TCP three-way handshake with another NE, such as NE 114.

At step 1303, the controller establishes a cBGP peer session with NE 114. For example, NE 111 establishes a cBGP peer session with NE 114 by sending an OPEN message indicating that NE 111 is capable of establishing a cBGP peer session. NE 111 then receives an OPEN message from NE 114 indicating that NE 114 is capable of establishing a cBGP peer session. As described with reference to FIG. 3, when both NE 111 and NE 114 are capable of establishing a cBGP peer session, the cBGP peer session is established between NE 111 and NE 114. In an embodiment, a first type of message is permitted to be communicated through the cBGP peer session. For example, the first type of message includes control messages excluding routing information 265, such as instructions, responses to the instructions, and status messages. In this embodiment, messages containing routing information 265 are prohibited from being communicated through the cBGP session.

At step 1306, NE 111 transmits a message to NE 114 through the cBGP peer session. For example, Tx/Rx 210 of NE 111 transmits a message to NE 114 through the cBGP peer session. For example, the message is an instruction regarding an interface of NE 114 and does not contain routing information 265.

At step 1309, NE 111 determines whether the message is permitted to be communicated through the cBGP session based on whether the message carries routing information 265. For example, the cBGP module 224 is executed by the processor 230 to determine whether the message is permitted to be communicated through the cBGP session based on whether the message carries routing information 265.

At step 1311, NE 111 transmits the message to the NE through the cBGP session if the message is permitted to be communicated through the cBGP session. For example, Tx/Rx 210 of NE 111 transmits the message to NE 114 if the message is permitted to be communicated through the cBGP session (i.e., if the message does not contain routing information 265).

At step 1315, NE 111 receives a response message from the NE through the cBGP session. For example, Tx/Rx 210 of NE 111 receives a response message from NE 114 through the cBGP peer session. For example, the response message indicates whether or not NE 114 has successfully assigned the segment identifier (SID) to the interface identified in the message sent at step 1306.

Figure 14:
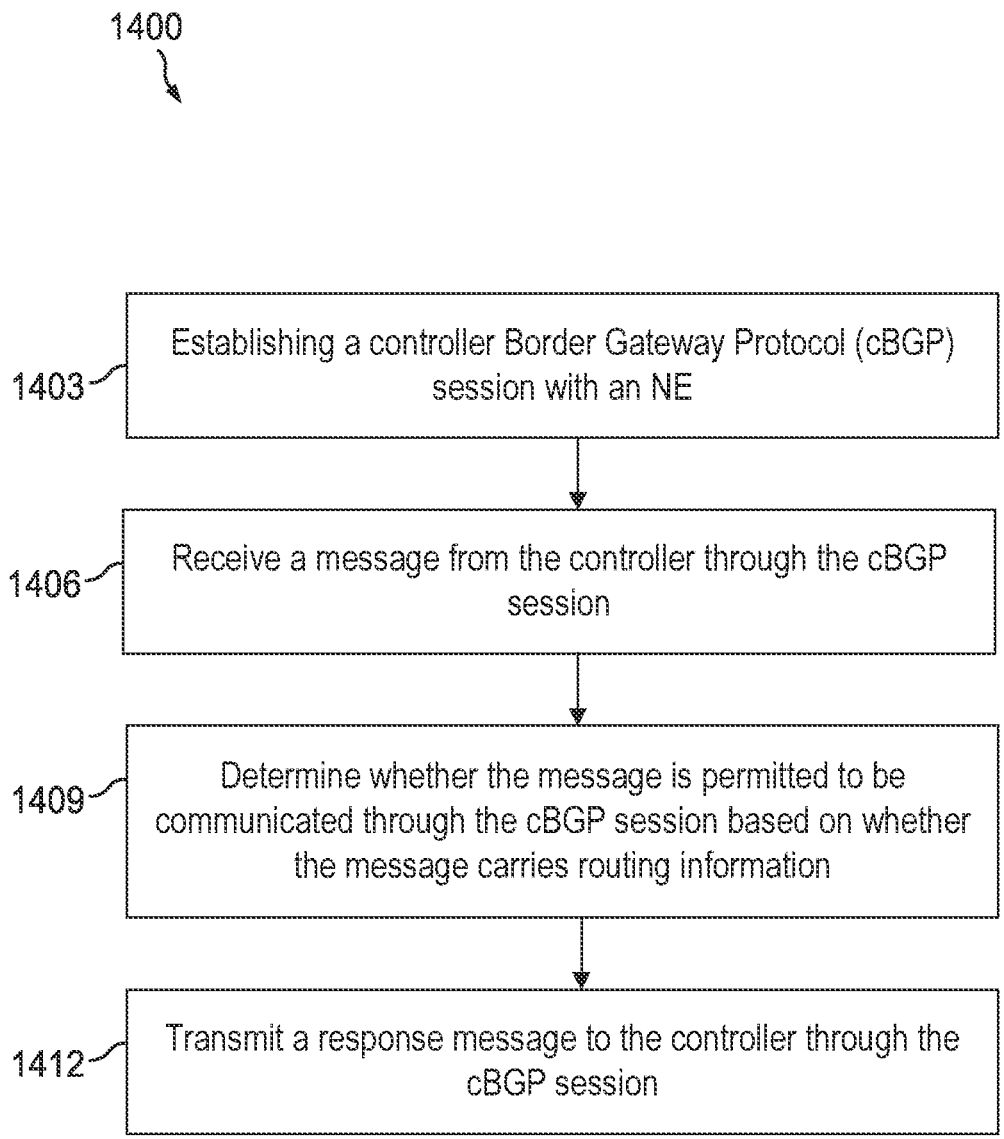
FIG. 14 is a flowchart illustrating another method of establishing a cBGP session and communicating data through a cBGP session according to various embodiments of the disclosure.

FIG. 14 is a flowchart illustrating another method 1400 of establishing a cBGP session and communicating data through a cBGP session according to various embodiments of the disclosure. Method 1400 may be implemented by an NE in the communications system 100 that is not the controller, such as NEs 109-110 or 112-115. Method 1400 may be implemented after the NE, such as NE 109, has established a TCP three-way handshake with the controller, such as NE 111.

At step 1403, the NE 109 establishes a cBGP peer session with NE 111. For example, NE 109 establishes a cBGP peer session with NE 111 by sending an OPEN message indicating that NE 109 is capable of establishing a cBGP peer session. NE 109 then receives an OPEN message from NE 111 indicating that NE 111 is capable of establishing a cBGP peer session. As described with reference to FIG. 3, when both NE 111 and NE 109 are capable of establishing a cBGP peer session, the cBGP peer session is established between NE 111 and NE 109. In an embodiment, a first type of message is permitted to be communicated through the cBGP peer session. For example, the first type of message includes control messages excluding routing information 265, such as instructions, responses to the instructions, and status messages. In this embodiment, messages containing routing information 265 are prohibited from being communicated through the cBGP session.

At step 1406, NE 109 receives a message from NE 111 through the cBGP peer session. For example, Tx/Rx 210 of NE 109 receives a message from NE 111 through the cBGP peer session. For example, the message of the first type is an instruction regarding an interface of NE 109 and does not contain routing information 265.

At step 1409, NE 109 determines whether the message is permitted to be communicated through the cBGP session based on whether the message carries routing information 265. For example, the cBGP module 224 is executed by the processor 230 to determine whether the message is permitted to be communicated through the cBGP session based on whether the message carries routing information 265.

At step 1412, NE 109 transmits a response message to NE 111 through the cBGP peer session. For example, Tx/Rx 210 of NE 109 transmits a response message to NE 111 through the cBGP peer session. For example, the response message indicates whether or not NE 109 has successfully assigned the segment identifier (SID) to the interface identified in the message sent at step 1406.

Figure 15:
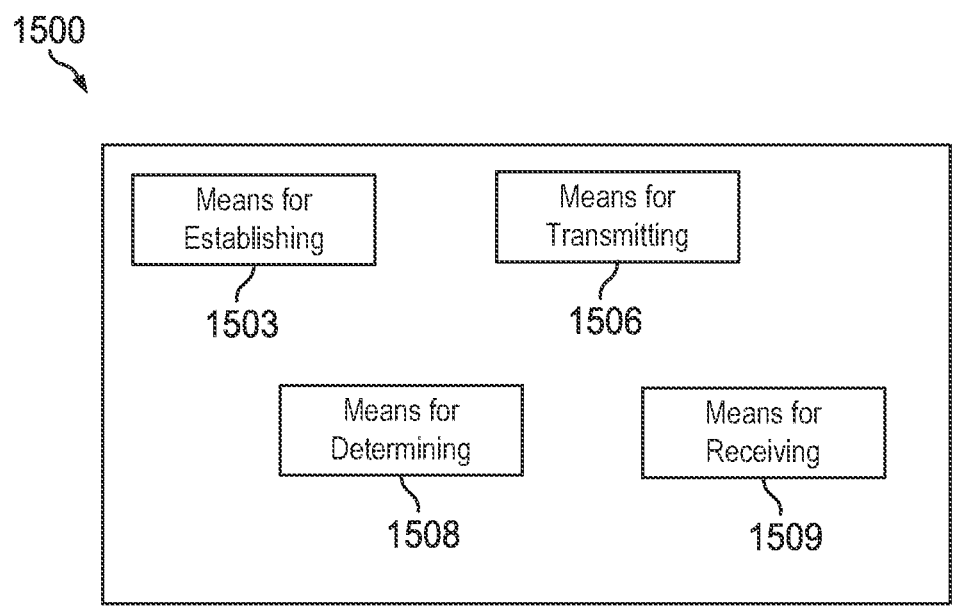
FIG. 15 is a diagram illustrating an apparatus for establishing a cBGP session and communicating data through a cBGP session according to various embodiments of the disclosure.

FIG. 15 is a diagram illustrating an apparatus 1500 for establishing a cBGP session and communicating data through a cBGP session according to various embodiments of the disclosure. The apparatus 1500 comprises a means for establishing 1503, a means for transmitting 1506, a means for determining 1508, and a means for receiving 1509.

In an embodiment in which the apparatus 1500 is implemented as a controller, the means for establishing 1503 comprises a means for establishing a cBGP peer session with another NE in the communications system, such as communications system 100 or 400. For example, NE 111 establishes a cBGP peer session with NE 114 by sending an OPEN message indicating that NE 111 is capable of establishing a cBGP peer session and receiving an OPEN message from NE 114 indicating that NE 114 is capable of establishing a cBGP peer session. As described with reference to FIG. 3, when both NE 111 and NE 114 are capable of establishing a cBGP peer session, the cBGP peer session is established between NE 111 and NE 114. In an embodiment, the means for receiving 1509 comprises a means for receiving a message for communication through the cBGP session to an NE 114. In this embodiment, the means for determining 1508 comprises a means for determining whether the message is permitted to be communicated through the cBGP session based on whether the message carries routing information 265. In this embodiment, the means for transmitting 1506 comprises a means for transmitting the message to the other NE in the communications system through the cBGP session. In this embodiment, means for receiving 1509 comprises a means for receiving a response message from the other NE in the communications system through the cBGP session.

In an embodiment in which the apparatus 1500 is implemented as an NE in the network excluding the controller, the means for establishing 1503 comprises establishing a cBGP peer session with the controller of the communications system. For example, NE 109 establishes a cBGP peer session with NE 111 by sending an OPEN message indicating that NE 109 is capable of establishing a cBGP peer session and receiving an OPEN message from NE 111 indicating that NE 111 is capable of establishing a cBGP peer session. As described with reference to FIG. 3, when both NE 111 and NE 109 are capable of establishing a cBGP peer session, the cBGP peer session is established between NE 111 and NE 109. The means for receiving 1509 comprises receiving a message from the controller through the cBGP session. The means for determining 1508 comprises a means for determining whether the message is permitted to be communicated through the cBGP session. The means for transmitting 1506 comprises transmitting a response message to the controller through the cBGP session.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented. A first type of message is permitted to be communicated through the combined BGP session, in which the first type of message is a control message excluding routing information 265. In this embodiment, a second type of message including routing information 265 is also permitted to be communicated through the combined BGP session.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method performed by a controller network element (NE) configured to implement Border Gateway Protocol (BGP) in a communications system, comprising:
   establishing, by the controller NE, a controller BGP (cBGP) session with a second NE;
   receiving, by the controller NE, a message from a third NE for communicating through the cBGP session;
   determining, by the controller NE, whether the message carries routing information;
   transmitting, by the controller NE, the message to the second NE through the cBGP session when the message does not carry the routing information; and
   receiving, by the controller NE, a response message of a first type from the second NE through the cBGP session,
      wherein a first type of message is a message carrying instructions, wherein a second type of message is a message carrying the routing information, wherein the controller NE and the second NE are included in a common autonomous system (AS) or in a second different AS, wherein the method further comprises the controller NE establishing an interior BGP (iBGP) session or an exterior BGP (eBGP) session with the second NE, wherein the iBGP session or the eBGP session is combined with the cBGP session, wherein the first type of message and the second type of message are permitted to be communicated through the combined session, or
      wherein a first type of message is permitted to be communicated through the cBGP session and a second type of message is prohibited from being communicated through the cBGP session, wherein the first type of message is a message carrying instructions, wherein the second type of message is a message carrying the routing information, wherein the controller NE and the second NE are included in a common autonomous system (AS) or a second different AS, wherein the method further comprises:
      establishing, by the controller NE, an interior BGP (iBGP) session or an exterior BGP (eBGP) session with the second NE, wherein the iBGP session or the eBGP session is separate and distinct from the cBGP session; and
      determining, by the controller NE, whether a second message received from the second NE includes the routing information based on a format of the second message.

2. The method of claim 1, wherein the routing information comprises information describing elements along a path from a source to a destination in the communications system.

3. The method of claim 1, further comprising:
   receiving, by the controller NE, a BGP UPDATE message carrying the routing information from another NE; and
   discarding, by the controller NE, the BGP UPDATE message.

4. The method of claim 1, further comprising:
   receiving, by the controller NE, a BGP UPDATE message carrying the routing information and instructions:
   removing, by the controller NE, the routing information from the BGP UPDATE message; and
   transmitting, by the controller NE, only the instructions of the BGP UPDATE message to the second NE though the cBGP session.

5. The method of claim 1, further comprising:
   obtaining a peer group, wherein the peer group comprises a plurality of NEs, wherein the plurality of NEs include the second NE, wherein a cBGP session is established between the controller NE and each NE of the plurality of NEs;
   receiving a third message comprising information of a first type from the second NE; and
   distributing the third message to other NEs in the peer group in response to the information of the first type being permitted to be distributed to the other NEs in the peer group based on a peer group policy.

6. The method of claim 5, wherein the plurality of NEs in the peer group are grouped together based on at least one of a tenant identifier (ID), a geographical district, a zone, a group name, or encryption method.

7. The method of claim 1, wherein the controller NE establishing the cBGP session with the second NE comprises:
   sending, by the controller NE, a first OPEN message to the second NE, wherein the first OPEN message comprises capabilities supported by the controller NE; and
   receiving, by the controller NE, a second OPEN message from the second NE, wherein the second OPEN message comprises capabilities supported by the second NE.

8. The method of claim 7, wherein the first OPEN message comprises an I flag and a C flag, wherein the I flag is set to indicate whether an independent cBGP session is to be established or a combined cBGP session is to be established, wherein the C flag is set to indicate that the first OPEN message is sent by the controller NE.

9. The method of claim 1, wherein the controller NE is a Route Reflector (RR) within an autonomous system (AS).

10. A method performed by a second network element (NE) configured to implement Border Gateway Protocol (BGP) in a communications system, comprising:
    establishing, by the second NE, a controller BGP (cBGP) session with a controller NE of the communications system;
    receiving, by the second NE, a message from the controller NE through the cBGP session;
    determining, by the second NE, whether the message carries routing information; and transmitting, by the second NE, a response message to the controller NE through the cBGP session when the message does not contain the routing information,
wherein a first type of message is a message carrying instructions, wherein a second type of message is a message carrying the routing information, wherein the controller NE and the second NE are included in a common autonomous system (AS) or in a second different AS, wherein the method further comprises the controller NE establishing an interior BGP (iBGP) session or an exterior BGP (eBGP) session with the second NE, wherein the iBGP session or the eBGP session is combined with the cBGP session, wherein the first type of message and the second type of message are permitted to be communicated through the combined session, or
wherein a first type of message is permitted to be communicated through the cBGP session and a second type of message is prohibited from being communicated through the cBGP session, wherein the first type of message is a message carrying instructions, wherein the second type of message is a message carrying the routing information, wherein the controller NE and the second NE are included in a common autonomous system (AS) or a second different AS, wherein the method further comprises:
establishing, by the controller NE, an interior BGP (IBGP) session or an exterior BGP (eBGP) session with the second NE, wherein the iBGP session or the eBGP session is separate and distinct from the cBGP session; and
determining, by the controller NE, whether a second message received from the second NE includes the routing information based on a format of the second message.

11. The method of claim 10, wherein the routing information comprises information describing elements along a path from a source to a destination in the communications system.

12. The method of claim 10, further comprising:
receiving, by the second NE, a BGP UPDATE message carrying the routing information from another NE; and
discarding, by the second NE, the BGP UPDATE message.

13. The method of claim 10, further comprising:
receiving, by the second NE, a BGP UPDATE message carrying the routing information and instructions;
removing, by the second NE, the routing information from the BGP UPDATE message; and
transmitting, by the second NE, only the instructions of the BGP UPDATE message to the controller NE through the cBGP session.

14. The method of claim 10, wherein a plurality of NEs in a peer group are grouped together based on at least one of a tenant identifier (ID), a geographical district, a zone, a group name, or encryption method.

15. The method of claim 10, wherein the establishing the cBGP session with the second NE comprises:
sending, by the second NE, a first OPEN message to the controller NE, wherein the first OPEN message comprises capabilities supported by the second NE; and
receiving, by the second NE, a second OPEN message from the controller NE, wherein the second OPEN message comprises capabilities supported by the controller NE.

16. The method of claim 15, wherein the first OPEN message comprises an I flag and a C flag, wherein the I flag is set to indicate whether an independent cBGP session is to be established or a combined cBGP session is to be established, wherein the C flag is set to indicate that the first OPEN message is not sent by the controller NE.

17. An apparatus, comprising:
a memory configured to store instructions; and
a processor coupled to the memory and configured to execute the instructions, which when executed by the processor, causes the apparatus to be configured to:
establish a controller Border Gateway Protocol BGP (cBGP) session with a second network element (NE);
receive a message from a third NE for communicating through the cBGP session;
determine whether the message carries routing information;
transmit the message to the second NE through the cBGP session when the message does not carry the routing information; and
receive a response message of a first type from the second NE through the cBGP session,
wherein a first type of message is a message carrying instructions, wherein a second type of message is a message carrying the routing information, wherein the controller NE and the second NE are included in a common autonomous system (AS) or in a second different AS, wherein the method further comprises the controller NE establishing an interior BGP (iBGP) session or an exterior BGP (eBGP) session with the second NE, wherein the iBGP session or the eBGP session is combined with the cBGP session, wherein the first type of message and the second type of message are permitted to be communicated through the combined session, or
wherein a first type of message is permitted to be communicated through the cBGP session and a second type of message is prohibited from being communicated through the cBGP session, wherein the first type of message is a message carrying instructions, wherein the second type of message is a message carrying the routing information, wherein the controller NE and the second NE are included in a common autonomous system (AS) or a second different AS, wherein the method further comprises:
establishing, by the controller NE, an interior BGP (iBGP) session or an exterior BGP (eBGP) session with the second NE, wherein the iBGP session or the eBGP session is separate and distinct from the cBGP session; and
determining, by the controller NE, whether a second message received from the second NE includes the routing information based on a format of the second message.

18. An apparatus, comprising:
a memory configured to store instructions; and
a processor coupled to the memory and configured to execute the instructions, which when executed by the processor, causes the processor to be configured to:
establish a controller Border Gateway Protocol BGP (cBGP) session with a controller network element (NE) of a communications system;
receive a message from the controller NE through the cBGP session;
determine whether the message carries routing information; and
transmit a response message to the controller NE through the cBGP session when the message does not carry the routing information, wherein a first type of message is a message carrying instructions, wherein a second type of message is a message carrying the routing information, wherein the controller NE and the second NE are included in a common autonomous system (AS) or in a second different AS, wherein the method further comprises the controller NE establishing an interior BGP (iBGP) session or an exterior BGP (eBGP) session with the second NE, wherein the iBGP session or the eBGP session is combined with the cBGP session, wherein the first type of message and the second type of message are permitted to be communicated through the combined session, or wherein a first type of message is permitted to be communicated through the cBGP session and a second type of message is prohibited from being communicated through the cBGP session, wherein the first type of message is a message carrying instructions, wherein the second type of message is a message carrying the routing information, wherein the controller NE and the second NE are included in a common autonomous system (AS) or a second different AS, wherein the method further comprises:

establishing, by the controller NE, an interior BGP (iBGP) session or an exterior BGP (eBGP) session with the second NE, wherein the iBGP session or the eBGP session is separate and distinct from the cBGP session; and determining, by the controller NE, whether a second message received from the second NE includes the routing information based on a format of the second message.

* * * * *